(12) United States Patent
Bong Doo

(10) Patent No.: US 7,778,663 B2
(45) Date of Patent: Aug. 17, 2010

(54) HINGE MODULE FOR THREE-STEP OPEN TYPE PORTABLE TERMINAL AND PORTABLE TERMINAL HAVING THE SAME

(75) Inventor: Choi Bong Doo, Youngtong-gu (KR)

(73) Assignee: Virgin Mobile USA, L.P., Warren, NJ (US)

( * ) Notice: Subject to any disclaimer, the term of this patent is extended or adjusted under 35 U.S.C. 154(b) by 1120 days.

(21) Appl. No.: 11/409,893

(22) Filed: Apr. 24, 2006

(65) Prior Publication Data

US 2007/0249394 A1    Oct. 25, 2007

(51) Int. Cl.
*H04M 1/00* (2006.01)
*G06F 3/02* (2006.01)
*H04B 1/38* (2006.01)

(52) U.S. Cl. ............... 455/556.1; 455/575.1; 455/575.3; 455/575.4; 455/550.1; 455/90.3; 379/419; 379/428; 379/433; 345/168; 345/169

(58) Field of Classification Search ............... 455/556.1, 455/90.3, 575.1, 575.3, 575.4, 550.1; 345/168–169; 379/168–169
See application file for complete search history.

(56) References Cited

U.S. PATENT DOCUMENTS

| | | | |
|---|---|---|---|
| 5,278,779 A | 1/1994 | Conway et al. | 364/708.1 |
| 5,644,338 A | 7/1997 | Bowen | 345/168 |
| 5,661,632 A | 8/1997 | Register | 361/683 |
| 5,898,161 A | 4/1999 | DeVita et al. | 235/462.44 |
| 6,483,445 B1 | 11/2002 | England | 341/22 |
| 6,535,605 B1 | 3/2003 | Ghassabian | 379/433.1 |
| 6,628,508 B2 | 9/2003 | Lieu et al. | 361/680 |
| 6,661,404 B1 | 12/2003 | Sirola et al. | 345/168 |
| 6,665,173 B2 | 12/2003 | Brandenberg et al. | 361/680 |
| 6,707,664 B2 | 3/2004 | Murphy | 361/680 |
| 6,798,649 B1 | 9/2004 | Olodort et al. | 361/683 |
| 6,798,882 B2 | 9/2004 | Kupiainen | 379/433.04 |
| 6,822,871 B2 | 11/2004 | Lee et al. | 361/727 |
| 6,829,139 B1 | 12/2004 | Duarte | 361/681 |
| 6,836,404 B2 | 12/2004 | Duarte | 361/680 |
| 6,850,226 B2 | 2/2005 | Finke-Anlauff | 345/169 |
| 7,016,182 B2 | 3/2006 | Brandenberg et al. | 361/683 |

(Continued)

FOREIGN PATENT DOCUMENTS

DE    203 17 865    3/2004

(Continued)

OTHER PUBLICATIONS

International Search Report for PCT/US2007/009716.

*Primary Examiner*—Vincent P Harper
*Assistant Examiner*—Khalid Shaheed
(74) *Attorney, Agent, or Firm*—Fenwick & West LLP

(57) ABSTRACT

Disclosed is a hinge module for a three-step open type portable terminal and a portable terminal having the same, in which a body of the portable terminal is divided into three body sections and semi-automatically slides. The portable terminal includes a hinge module, which couples the upper body to the intermediate body in such a manner that the upper body is movable in a transverse direction relative to the intermediate body and couples the lower body to the intermediate body in such a manner that the lower body is movable in a longitudinal direction relative to the intermediate body.

22 Claims, 20 Drawing Sheets

U.S. PATENT DOCUMENTS

| | | | |
|---|---|---|---|
| 7,076,058 B2 | 7/2006 | Ikeuchi et al. | 379/419 |
| D526,983 S | 8/2006 | Gong et al. | D14/138 |
| 7,107,018 B2 | 9/2006 | Jellicoe | 455/90.3 |
| 2004/0058703 A1 | 3/2004 | Eromaki et al. | 455/550.1 |
| 2005/0041382 A1 | 2/2005 | Chang et al. | 361/683 |
| 2005/0059438 A1* | 3/2005 | Jellicoe | 455/575.1 |
| 2005/0104856 A1 | 5/2005 | Jacobs et al. | 345/169 |
| 2005/0104857 A1 | 5/2005 | Jacobs et al. | 345/169 |
| 2005/0107119 A1 | 5/2005 | Lee et al. | 455/556.1 |
| 2006/0046796 A1* | 3/2006 | Park et al. | 455/575.4 |
| 2006/0061552 A1 | 3/2006 | Santos et al. | |
| 2006/0061943 A1* | 3/2006 | Santos et al. | 361/679 |
| 2006/0146014 A1 | 7/2006 | Lehtonen | 345/156 |

FOREIGN PATENT DOCUMENTS

| | | |
|---|---|---|
| EP | 1 594 289 | 11/2005 |
| EP | 1 631 043 | 3/2006 |
| GB | 2 279 617 | 1/1995 |
| GB | 2 375 683 | 11/2002 |
| KR | 10-2005-0104665 | 11/2005 |
| WO | WO2005/091515 | 9/2005 |
| WO | WO2006/031078 | 3/2006 |

* cited by examiner

HINGE MODULE FOR THREE-STEP OPEN TYPE PORTABLE TERMINAL AND PORTABLE TERMINAL HAVING THE SAME

FIELD OF THE INVENTION

The present invention relates to a portable terminal. More particularly, the present invention relates to a hinge module for a three-step open type portable terminal and a portable terminal having the same, in which a body of the portable terminal is divided into three body sections and semi-automatically slides, thereby realizing an optimum input/output system in a communication terminal, such as a mobile phone, a PDA, a DMB (digital multimedia broadcasting) phone, or a personal multimedia player.

DESCRIPTION OF THE PRIOR ART

As generally known in the art, communication terminals are classified into wired communication terminals and wireless communication terminals. The wired communication terminals include desk-type phones used in an office or a home and the wireless communication terminals include PCSs, cellular phones or PDAs.

As communication technologies have been developed, such communication terminals have advanced into intelligent multi-terminals capable of providing users with various multi-media services, such as text messages, image information and games, through a screen in addition to basic voice information.

Thus, various communication terminals equipped with screens have been developed so as to allow the users to conveniently use the multi-media services.

FIG. 1 is an exploded perspective view illustrating a conventional sliding type portable terminal.

As shown in FIG. 1, the conventional sliding type portable terminal includes a body 10 provided at a front lower portion thereof with a keypad 11, a cover 20 provided at a front surface thereof with a front screen 21 and an auxiliary keypad 22 and slidably coupled to the body 10, and a hinge module 30 for enabling the cover 20 to semi-automatically slide relative to the body 10.

In the conventional sliding type portable terminal having the above structure, if the user pushes up the cover 20, the cover 20 moves up to a predetermined position relative to the body 10. When the cover 20 moves beyond the predetermined position, the cover 20 automatically slides along the body 10 by means of the elastic force of a torsion spring 31 of the hinge module 30, thereby exposing the body 10.

However, since the conventional sliding type portable terminal has a two-step structure, it is difficult to use the conventional sliding type portable terminal as an intelligent multi-terminal, such as a DMB phone or a personal multimedia player, which has recently been spotlighted in view of multimedia services including the DMB service.

That is, in the case of the conventional sliding type portable terminal, the installation area for the front screen 21 and the keypad 11 is confined within the front surfaces of the body 10 and the cover 20, respectively. In addition, the keypad 11 installed on apart of the front surface of the body 10 is a 3×4 keypad, so the keypad 11 is only suitable for inputting numbers for dialing or simple characters for simple text messages, but not suitable for inputting various types of characters. This is because the arrangement of the 3×4 keypad makes it difficult to effectively input various types of characters.

Therefore, the conventional sliding type portable terminal having the two-step structure is not adaptable for intelligent multi-terminals, such as DMB phones or personal multimedia players.

SUMMARY OF THE INVENTION

Accordingly, embodiments of the claimed invention address the above-mentioned problems occurring in the prior art, by providing a hinge module for a three-step open type portable terminal and a portable terminal having the same, in which a body of the portable terminal is divided into three body sections and semi-automatically slides.

In one aspect of the claimed invention, there is provided a hinge module for a three-step open type portable terminal including an upper body, an intermediate body and a lower body, wherein the hinge module couples the upper body to the intermediate body in such a manner that the upper body is movable in a transverse direction or a longitudinal direction, and the hinge module couples the lower body to the intermediate body in such a manner that the lower body is movable in the transverse direction or the longitudinal direction perpendicularly to a movement direction of the upper body.

The hinge module prevents the upper and lower bodies from simultaneously moving into an opened position relative to the intermediate body.

The hinge module includes an intermediate plate fixed to the intermediate body of the portable terminal and formed with a longitudinal guide hole; an upper plate fixed to the upper body of the portable terminal, coupled to the intermediate plate in such a manner that the upper plate is movable in a transverse direction relative to the intermediate plate, and provided with a guide track extending in transverse and longitudinal directions; and a lower plate fixed to the lower body of the portable terminal, coupled to the intermediate plate in such a manner that the lower plate is movable in a longitudinal direction relative to the intermediate plate, and provided with a guide pin, which passes through the guide hole of the intermediate plate and moves along the guide track of the upper plate in order to prevent the upper and lower bodies from simultaneously moving into the opened position relative to the intermediate body.

The guide track is formed along a lower edge portion of the upper plate.

The hinge module further comprises an elastic member installed between the intermediate plate and the upper plate and between the intermediate plate and the lower plate, respectively, wherein the elastic member applies an elastic force to the upper and lower plates in such a way that the upper and lower plates are biased to a closed position relative to the intermediate plate when the upper and lower plates move within a threshold point and biased to an opened position relative to the intermediate plate when the upper and lower plates move beyond the threshold point.

The elastic member includes a pair of first torsion springs installed between the intermediate plate and the upper plate and a pair of second torsion springs installed between the intermediate plate and the lower plate.

The hinge module includes an intermediate plate fixed to the intermediate body of the portable terminal and formed with a longitudinal guide hole and a transverse guide hole; an upper plate fixed to the upper body of the portable terminal and coupled to the intermediate plate in such a manner that the upper plate is movable in a transverse direction relative to the intermediate plate; a lower plate fixed to the lower body of the portable terminal and coupled to the intermediate plate in such a manner that the lower plate is movable in a longitudinal direction relative to the intermediate plate; and a guide member having a first end portion hinged to the upper plate and moved along the transverse guide hole and a second end portion hinged to the lower plate while passing through the longitudinal guide hole and moved along the longitudinal guide hole, wherein the guide member is expanded or contracted corresponding to a movement of the upper and lower plates.

The guide member has an extendable property and applies an elastic force to the upper and lower plates so as to bias the upper and lower plates to a closed position relative to the intermediate plate when the first and second end portions of the guide member move within a cross point between the transverse guide hole and the longitudinal guide hole and to bias the upper and lower plates to an opened position relative to the intermediate plate when the first and second end portions of the guide member move beyond the cross point.

The guide member includes first and second guide bars, which are overlapped with each other and front end portions of which are directed in opposition to each other, a spring group having a plurality of springs coupled to both sides of the first and second guide bars so as to apply an elastic force to the first and second guide bars such that the first and second guide bars are biased in opposition to each other, an upper coupling pin extending by passing through the upper plate and rotatably passing through the front end portion of the first guide bar so as to be slidably coupled into the transverse guide hole; and a lower coupling pin extending by passing through the lower plate and slidably passing through the longitudinal guide hole so as to be rotatably coupled into a front end portion of the second guide bar.

The spring group includes compression springs installed between the front end portion of the first guide bar and a rear end portion of the second guide bar and between the front end portion of the second guide bar and a rear end portion of the first guide bar so as to bias the first and second guide bars; and tension springs connected between rear end portions of the first and second guide bars in an overlapped area between the first and second guide bars so as to apply a tensioning force to the first and second guide bars.

The first and second guide bars are formed at front and rear end portions thereof with cutting sections, protrusions are provided in the cutting sections so as to allow the compression springs to be coupled with the protrusions, and coupling protrusions are provided at both sides of the rear end portions of the first and second guide bar so as to allow the tension springs to be coupled with the coupling protrusions.

The guide member includes a housing assembly including a plurality of housings having inlets formed in opposition to each other, first and second movement bars inserted into the inlets of the housings such that the first and second movement bars are reciprocated in opposition to each other, compression springs installed in the housings so as to apply an elastic force to the first and second movement bars, respectively, an upper coupling member coupled to a front end portion of the first movement bar and provided with an upper coupling protrusion rotatably inserted into the upper plate and a guide protrusion slidably inserted into the transverse guide hole so as to move along the transverse guide hole; and a lower coupling member coupled to a front end portion of the second movement bar and provided with a lower coupling protrusion, which is slidably inserted into the longitudinal guide hole and rotatably inserted into the lower plate.

The intermediate plate is provided at front and rear end portions of an upper surface thereof with transverse rails having "ㄷ"-shaped sections, the upper plate is provided at front and rear end portions of a lower surface thereof with transverse rails having L-shaped sections, and the traverse rails having L-shaped sections are slidably coupled with the transverse rails having "ㄷ"-shaped sections so that the upper plate is coupled with the intermediate plate.

The intermediate plate is provided at left and right end portions of a lower surface thereof with longitudinal rails having "ㄷ"-shaped sections, the lower plate is provided at left and right end portions of an upper surface thereof with longitudinal sliding members having reverse L-shaped sections, and the longitudinal sliding members having reverse L-shaped sections are slidably coupled with the longitudinal rails having "ㄷ"-shaped sections so that the lower plate is coupled with the intermediate plate.

According to another aspect of the claimed invention, there is provided a three-step open type portable terminal comprising: an upper body, an intermediate body, a lower body, and a hinge module, wherein the hinge module couples the upper body to the intermediate body in such a manner that the upper body is movable in a transverse direction relative to the intermediate body, the hinge module couples the lower body to the intermediate body in such a manner that the lower body is movable in a longitudinal direction relative to the intermediate body and the hinge module prevents the upper and lower bodies from simultaneously moving into an opened position relative to the intermediate body.

The upper body is provided at an upper surface thereof with a screen and a first keypad group, the intermediate body is provided at an upper surface thereof with a second keypad group and the lower body is provided at an upper surface thereof with a third keypad group.

The first keypad group is aligned at left and right portions of the upper body about the screen, the second keypad group is aligned at an exposed portion of the intermediate body, and the third keypad group is aligned at a front part of an exposed portion of the lower body.

The hinge module includes an intermediate plate fixed to the intermediate body, an upper plate fixed to the upper body and coupled to the intermediate plate in such a way that the upper plate is moveable in a transverse direction relative to the intermediate plate; and a lower plate fixed to the lower body and coupled to the intermediate plate in such a way that the lower plate is moveable in a longitudinal direction relative to the intermediate plate.

The intermediate plate is provided at front and rear end portions of an upper surface thereof with transverse rails having "ㄷ"-shaped sections, the upper plate is provided at front and rear end portions of a lower surface thereof with transverse rails having L-shaped sections, and the transverse rails having L-shaped sections are slidably coupled with the transverse rails having "ㄷ"-shaped sections so that the upper plate is coupled with the intermediate plate. The intermediate plate is provided at left and right end portions of a lower surface thereof with longitudinal rails having "ㄷ"-shaped sections, the lower plate is provided at left and right end portions of an upper surface thereof with longitudinal sliding members having reverse L-shaped sections, and the longitudinal sliding members having reverse L-shaped sections are slidably coupled with the longitudinal rails having "ㄷ"-shaped sections so that the lower plate is coupled with the intermediate plate.

The intermediate plate further includes a longitudinal guide hole, the upper plate further includes a guide track formed at a lower edge portion of the upper plate in transverse and longitudinal directions, and the lower plate further includes a guide pin, which passes through the longitudinal guide hole of the intermediate plate and moves along the guide track of the upper plate in order to prevent the upper and lower bodies from simultaneously moving into an opened position relative to the intermediate plate.

The hinge module further comprises an elastic member for applying an elastic force to the upper and lower plates in such a way that the upper and lower plates are biased to a closed position relative to the intermediate plate when the upper and lower plates move within a threshold point and biased to an opened position relative to the intermediate plate when the upper and lower plates move beyond the threshold point, wherein the elastic member includes a pair of first torsion springs installed between the intermediate plate and the upper plate and a pair of second torsion springs installed between the intermediate plate and the lower plate.

The intermediate plate includes a transverse guide hole and a longitudinal guide hole perpendicular to the transverse guide hole, and the hinge module includes a guide member having a first end portion hinged to the upper plate and moved along the transverse guide hole and a second end portion hinged to the lower plate while passing through the longitudinal guide hole and moved along the longitudinal guide hole, wherein the guide member is expanded or contracted corresponding to a movement of the upper and lower plates, and the guide member applies an elastic force to the upper and lower plates so as to bias the upper and lower plates to a closed position relative to the intermediate plate when the first and second end portions of the guide member move within a cross point between the transverse guide hole and the longitudinal guide hole and to bias the upper and lower plates to an opened position relative to the intermediate plate when the first and second end portions of the guide member move beyond the cross point, the guide member includes first and second guide bars, a spring group, an upper coupling pin and a lower coupling, the first and second guide bars are formed at front and rear end portions thereof with cutting sections, protrusions are provided in the cutting sections, coupling protrusions are provided at both sides of the rear end portions of the first and second guide bar, and the first and second guide bars are overlapped with each other such that front end portions of which are directed in opposition to each other, the spring group includes a pair of compression springs and a pair of tension springs for biasing the first and second guide bars in opposition to each other, in which the compression springs have first end portions coupled with the protrusions provided at the front end portion of the first guide bar and a rear end portion of the second guide bar and second end portions coupled with the protrusions provided at the front end portion of the second guide bar and a rear end portion of the first guide bar, and the tension springs are coupled with the coupling protrusions provided at rear end portions of the first and second guide bars in an overlapped area between the first and second guide bars, the upper coupling pin extends by passing through the upper plate and rotatably passing through the front end portion of the first guide bar so as to be slidably coupled into the transverse guide hole, and the lower coupling pin extends by passing through the lower plate and slidably passing through the longitudinal guide hole so as to be rotatably coupled into a front end portion of the second guide bar.

The intermediate plate includes a transverse guide hole and a longitudinal guide hole perpendicular to the transverse guide hole, and the hinge module includes a guide member having a first end portion hinged to the upper plate and moved along the transverse guide hole and a second end portion hinged to the lower plate while passing through the longitudinal guide hole and moved along the longitudinal guide hole, wherein the guide member is expanded or contracted corresponding to a movement of the upper and lower plates, and the guide member applies an elastic force to the upper and lower plates so as to bias the upper and lower plates to a closed position relative to the intermediate plate when the first and second end portions of the guide member move within a cross point between the transverse guide hole and the longitudinal guide hole and to bias the upper and lower plates to an opened position relative to the intermediate plate when the first and second end portions of the guide member move beyond the cross point, the guide member including a housing assembly consisting of a plurality of housings having inlets formed in opposition to each other, first and second movement bars inserted into the inlets of the housings such that the first and second movement bars are reciprocated in opposition to each other, compression springs installed in the housings so as to apply an elastic force to the first and second movement bars, respectively, an upper coupling member coupled to a front end portion of the first movement bar and provided with an upper coupling protrusion rotatably inserted into the upper plate and a guide protrusion slidably inserted into the transverse guide hole so as to move along the transverse guide hole, and a lower coupling member coupled to a front end portion of the second movement bar and provided with a lower coupling protrusion, which is slidably inserted into the longitudinal guide hole and rotatably inserted into the lower plate.

BRIEF DESCRIPTION OF THE DRAWINGS

The above and other objects, features and advantages of the present invention will be more apparent from the following detailed description which should be taken in conjunction with the accompanying drawings, and in which.

DETAILED DESCRIPTION OF THE PREFERRED EMBODIMENTS

Hereinafter, the present invention will be described with reference to accompanying drawings.

Figure 1:
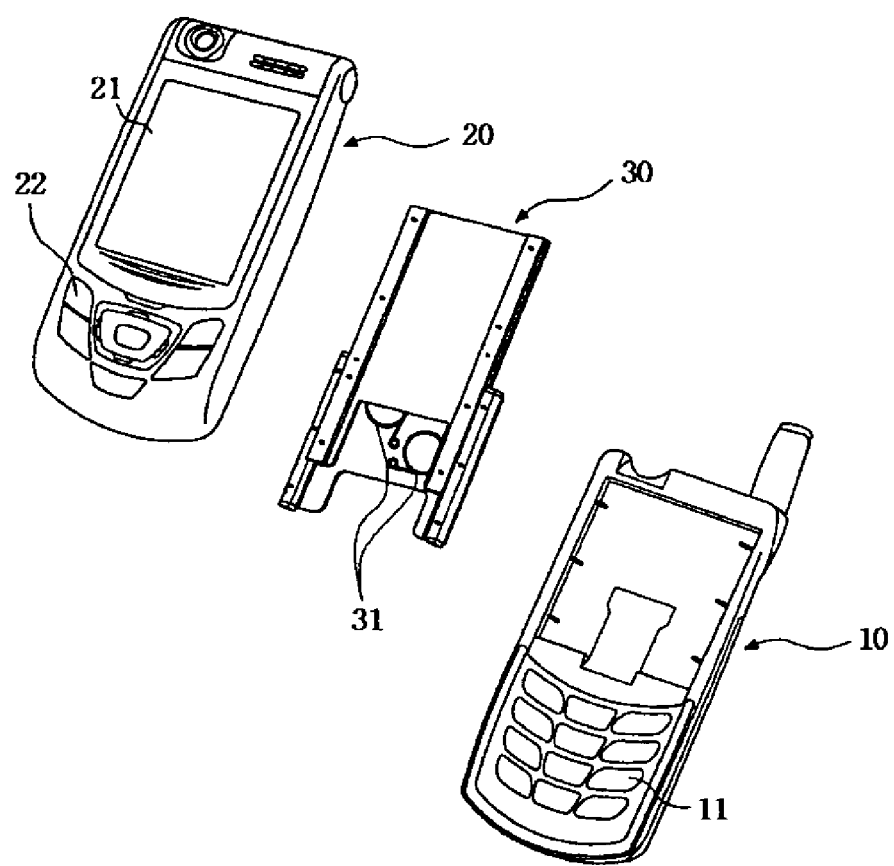
FIG. 1 is an exploded perspective view illustrating a conventional sliding type portable terminal.
Figure 2:
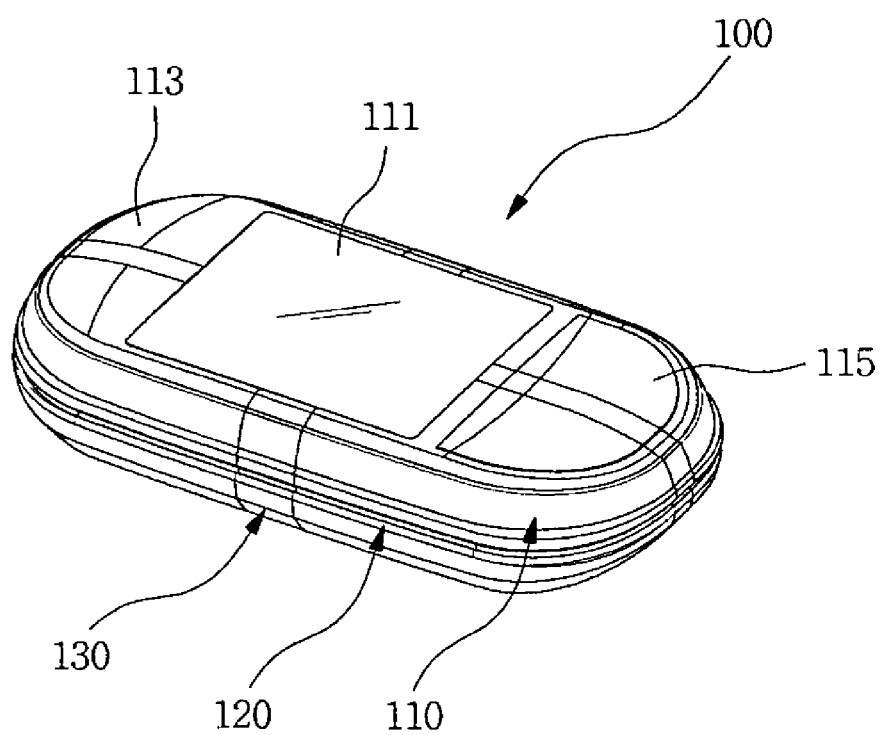
FIGS. 2 through 4 are perspective views illustrating operational states of a portable terminal according to one embodiment of the present invention.
Figure 3:
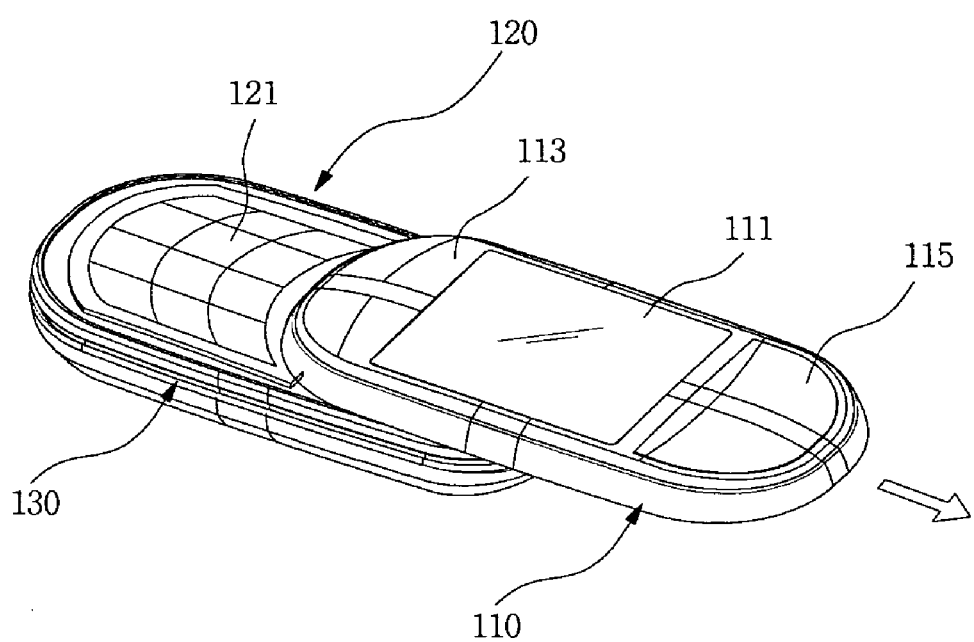
Figure 4:
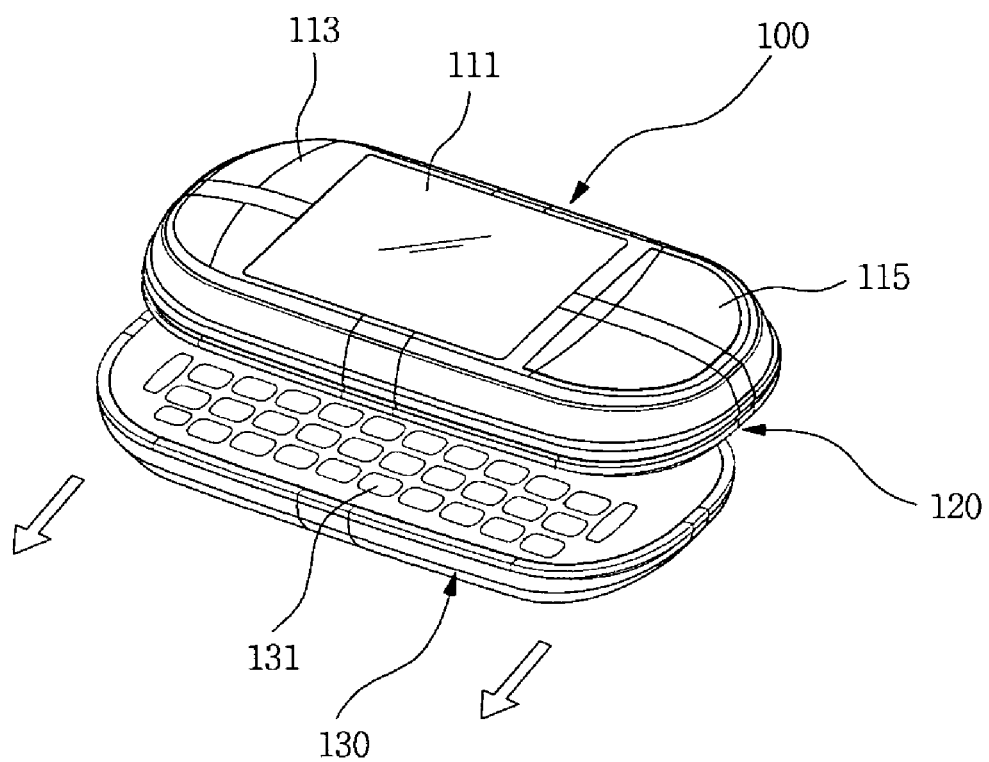

FIGS. 2 through 4 are perspective views illustrating operational states of a portable terminal 100 according to one embodiment of the present invention.

As shown in FIGS. 2 through 4, the portable terminal 100 according to the present invention is a three-step open type portable terminal including an upper body 110, an intermediate body 120 and a lower body 130. The upper body 110 slidably moves in leftward and rightward directions relative to the intermediate body 120 and the lower body 130 slidably moves in forward and rearward directions relative to the intermediate body 120.

In the three-step open type portable terminal 100, a screen 111 and keypad groups 113, 115, 121, and 131 equipped with various types of input keys can be installed on upper surfaces of the upper, intermediate and lower bodies 110, 120 and 130, respectively. For instance, the screen 111 is provided on the center of the upper surface of the upper body 110 and first keypad groups 113 and 115, which are called "navigation keys", are provided at left and right portions of the upper surface of the upper body 110, respectively. In addition, as shown in FIG. 3, a second keypad group 121, which is a "3×4 keypad", is provided at a left portion of the upper surface of the intermediate body 12. Thus, if the upper body 110 slidably moves in the rightward direction relative to the intermediate body 120, the second keypad group 121 is exposed to an exterior, so that the user can make a call (dialing) or can input simple characters using the second keypad group 121. A third keypad group 131 equipped with various input keys is provided at a lower portion of the upper surface of the lower body 130 so as to allow the user to input various types of characters. That is, if the lower body 130 slidably moves in the forward direction relative to the intermediate body 120, the third keypad group 131 is exposed to the exterior, so that the user can use the portable terminal 100 for various purposes, such as an electronic dictionary, etc., by utilizing the third keypad group 131.

As mentioned above, the three-step open type portable terminal 100 according to the present invention includes three body sections, which are semi-automatically slid, thereby realizing an optimum input/output system in a communication terminal, such as a mobile phone, a PDA, a DMB (digital multimedia broadcasting) phone, or a personal multimedia player.

Hereinafter, the portable terminal according to the present invention will be described in detail while focusing on a hinge module, which allows the upper and lower bodies 110 and 130 to semi-automatically slide relative to the intermediate body 120.

Figure 5:
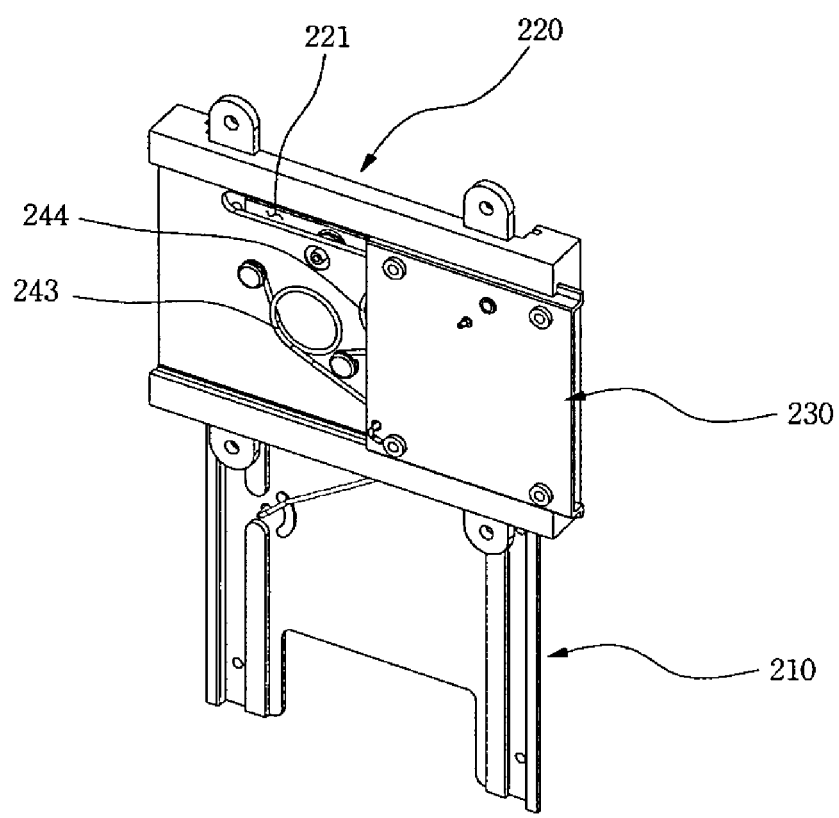
FIG. 5 is a perspective view illustrating a hinge module according to one embodiment of the present invention.
Figure 6:
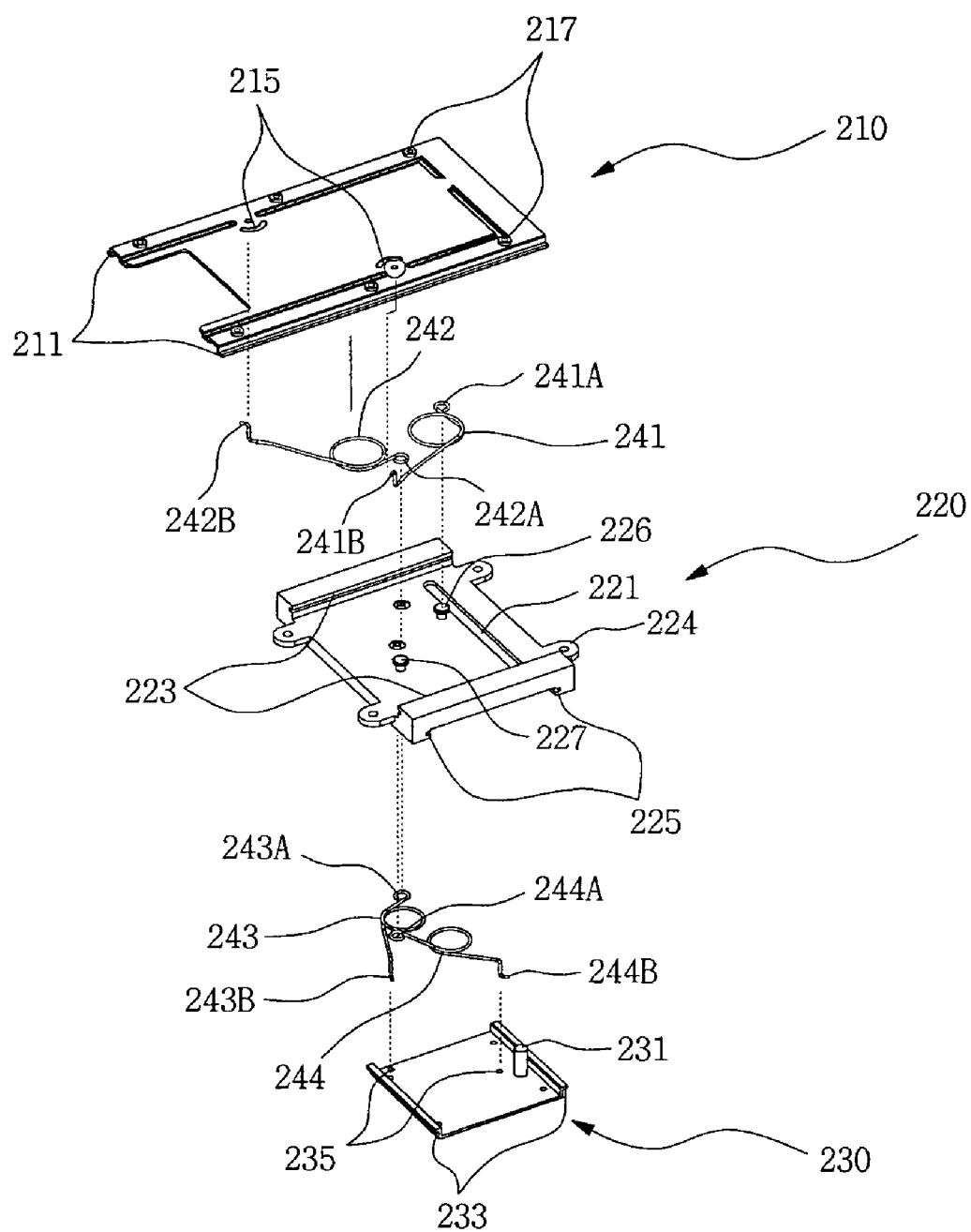
FIG. 6 is an exploded perspective view illustrating a hinge module according to one embodiment of the present invention.
Figure 7:
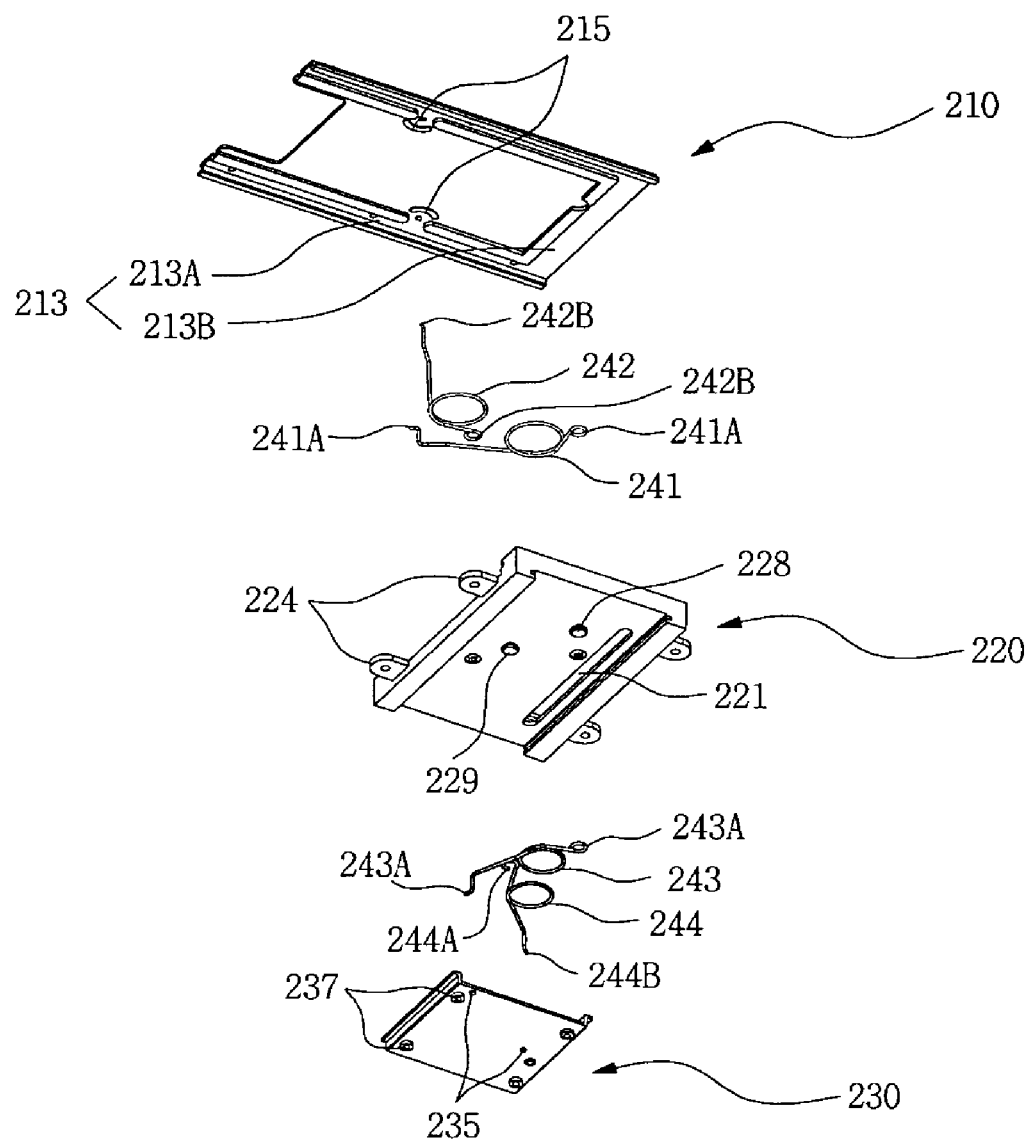
FIG. 7 is a bottom view of FIG. 6.
Figure 8:
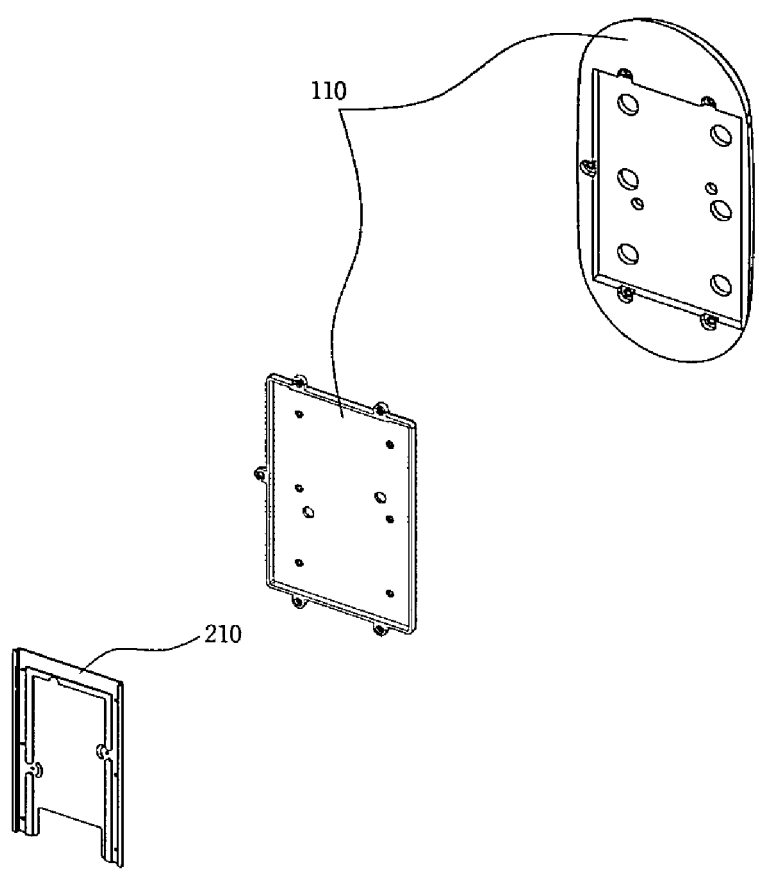
FIGS. 8 through 10 are perspective views illustrating coupling states between elements of a hinge module and bodies of a portable terminal according to one embodiment of the present invention.
Figure 9:
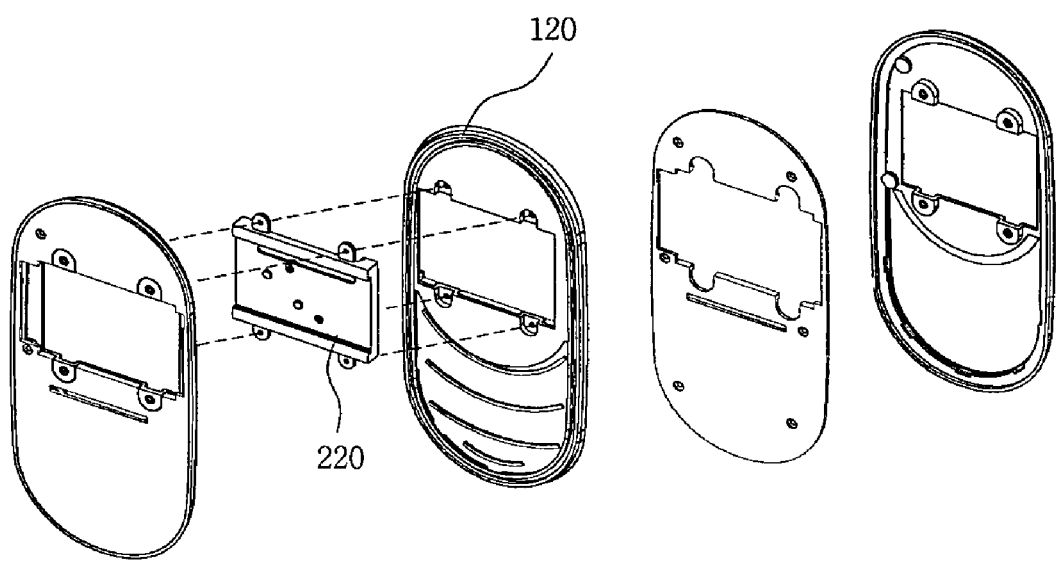
Figure 10:
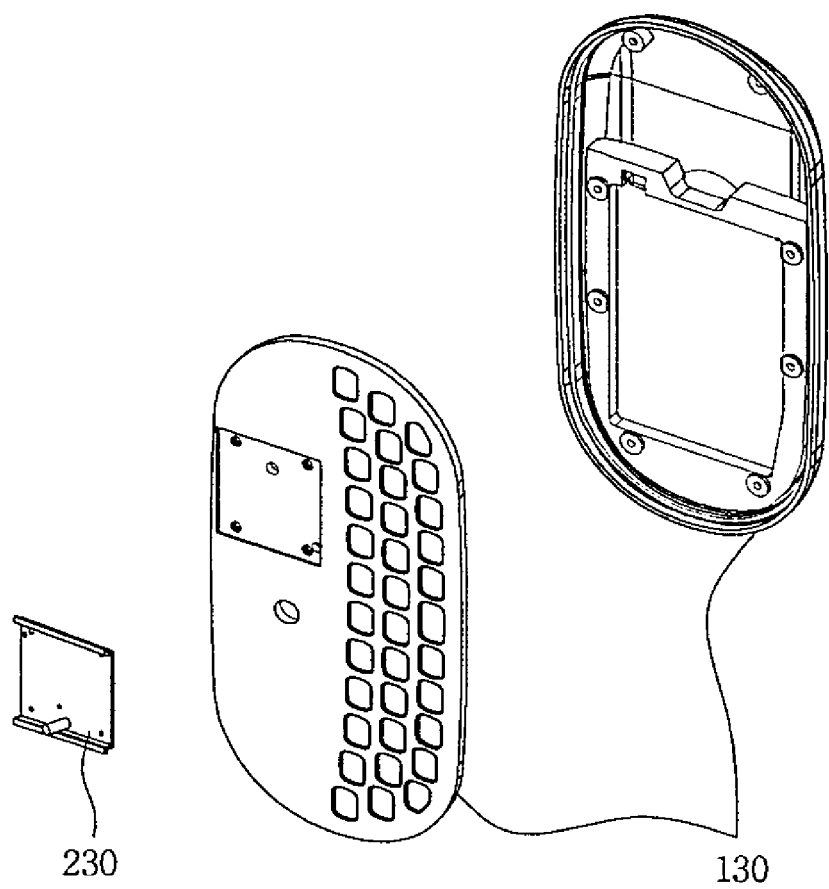

FIG. 5 is a perspective view illustrating the hinge module according to one embodiment of the present invention, FIG. 6 is an exploded perspective view illustrating the hinge module according to one embodiment of the present invention, and FIG. 7 is a bottom view of the hinge module shown in FIG. 6. In addition, FIGS. 8 to 10 are perspective views illustrating coupling states between elements of the hinge module and bodies of the portable terminal according to one embodiment of the present invention.

As shown in FIGS. 5 through 10, the hinge module 200 according to the present invention includes an upper plate 210, an intermediate plate 220, a lower plate 230 and elastic members 241, 242, 243 and 244. The upper and lower plates 210 and 230 are coupled to the intermediate plate 220 in such a manner that the upper plate 210 slidably moves in leftward and rightward directions and the lower plate 230 slidably moves in forward and rearward directions relative to the intermediate plate 220. Hereinafter, description will be made in detail in relation to structures of the above elements.

The intermediate plate 220 is fixed to the intermediate body 120 of the portable terminal (see, FIG. 9) and has a guide hole 221, which is vertically formed along the intermediate plate 220 in such a manner that a guide pin 231 of the lower plate 230 is inserted into the guide hole 221 and moves along the guide hole 221. The intermediate plate 220 is provided at front and rear end portions of the upper surface thereof with transverse rails 223 having "⊏"-shaped sections so that the intermediate plate 220 is coupled with the upper plate 210 through the transverse rails 223. In addition, the intermediate plate 220 is provided at left and right end portions of the lower surface thereof with longitudinal rails 225 having "⊏"-shaped sections so that the intermediate plate 220 is coupled with the lower plate 230 through the longitudinal rails 225. Hanger pins 226 and 227 are installed on the upper surface of the intermediate plate 220 in such a manner that links 241A and 242A of torsion springs 241 and 242 can be rotatably coupled with the hanger pins 226 and 227. In the same way, hanger pins 228 and 229 are installed on the lower surface of the intermediate plate 220 in such a manner that links 243A and 244A of torsion springs 243 and 244 can be rotatably coupled with the hanger pins 228 and 229. In addition, screw coupling plates 224 having screw holes are provided at left and right end portions of the intermediate plate 220, so that the intermediate plate 220 is screw-coupled with the intermediate body 120 through the screw coupling plates 224.

The upper plate 210 is fixedly coupled to the upper body 110 of the portable terminal (see, FIG. 8) and is slidably coupled to the intermediate plate 220 in such a manner that the upper plate 210 can move in the leftward and rightward directions relative to the intermediate plate 220. To this end, transverse sliding members 211 having "L"-shaped sections, which are slidably coupled with the transverse rails 223, are provided at front and rear end portions of the lower surface of the upper plate 210. In addition, the upper plate 210 has a guide track 213, which provides transverse and longitudinal routes, and an end portion of the guide pin 231 of the lower plate 230 moves along the guide track 213 while making contact with the guide track 213. The guide track 213 includes a transverse guide track 213A and a longitudinal guide track 213B, which are formed along an edge of the lower surface of the upper plate. The upper plate 210 is formed with spring holes 215 into which end portions 241B and 242B of the torsion springs 241 and 242 are inserted with a predetermined tolerance.

The lower plate 230 is fixedly coupled to the lower body 130 of the portable terminal (see, FIG. 10) and is slidably coupled to the intermediate plate 220 in such a manner that the lower plate 230 can move in the forward and rearward directions relative to the intermediate plate 220. To this end, transverse sliding members 211 having "reverse L"-shaped sections, which are slidably coupled with the longitudinal rails 225, are provided at left and right end portions of the upper surface of the lower plate 230. In addition the lower plate 230 is provided at the upper surface thereof with a guide pin 231, which prevents the upper and lower bodies 110 and 130 from simultaneously moving into the opened position.

The guide pin 231 extends by passing through the guide hole 221 of the intermediate plate 220 and the end portion of the guide pin 231 moves along the guide track 213 of the upper plate 210. Similar to the upper plate 210, the lower plate 230 is formed with spring holes 235 into which end portions 243B and 244B of the torsion springs 243 and 244 are inserted with a predetermined tolerance.

The elastic member consists of upper torsion springs 241 and 242 installed between the intermediate plate 220 and the upper plate 210 and lower torsion springs 243 and 244 installed between the intermediate plate 220 and the lower plate 230. Thus, the elastic member causes the upper and lower plates 210 and 230 to be maintained in a closed position when the upper and lower plates 210 and 230 move within a threshold point. If the upper and lower plates 210 and 230 move beyond the threshold point, the elastic member causes the upper and lower plates 210 and 230 to be maintained in the opened position relative to the intermediate plate 220.

Figure 11:
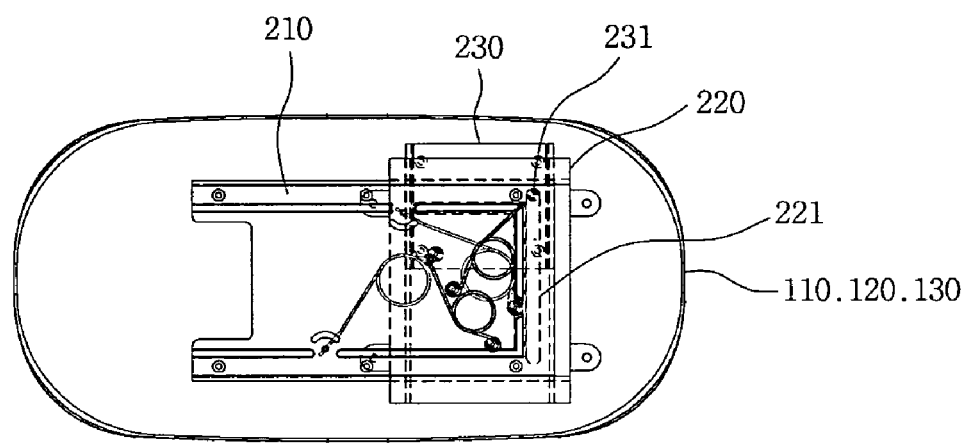
FIGS. 11 through 13 are reference views illustrating operational states of a hinge module according to one embodiment of the present invention.
Figure 12:
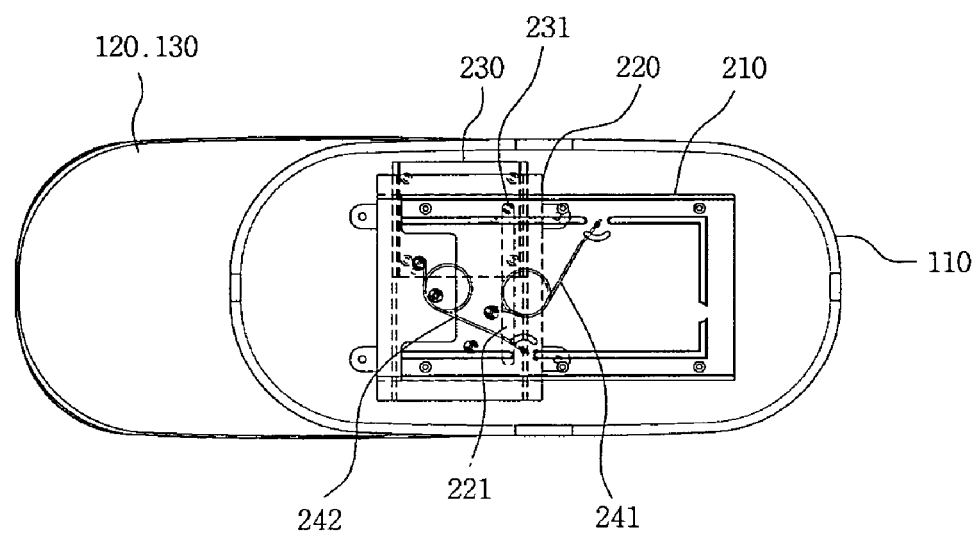
Figure 13:
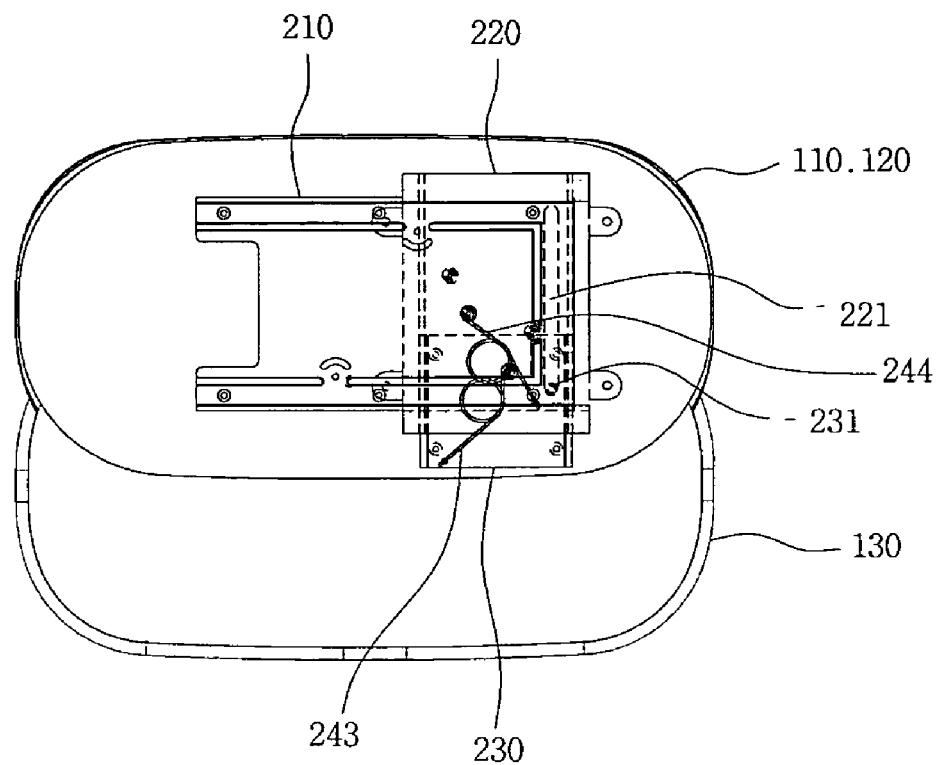

Hereinafter, the operation of the hinge module 200 according to the present invention will be described with reference to accompanying drawings, especially with reference to FIGS. 11 through 13. FIGS. 11 through 13 are reference views for explaining the operational state of the hinge module 200 according to the present invention.

FIG. 11 illustrates the hinge module when the upper and lower bodies 110 and 130 are aligned in a closed position relative to the intermediate body 120. In this state, the upper plate 210 is biased to the leftward direction and the lower plate 230 is biased to the rearward direction relative to the intermediate plate 220, respectively. At this time, the upper torsion springs 241 and 242 installed at the upper portion of the intermediate plate 220 while being supported by the intermediate plate 220 elastically bias the upper plate 210 to the leftward direction and the lower torsion springs 243 and 244 installed at the lower portion of the intermediate plate 220 while being supported by the intermediate plate 220 elastically bias the lower plate 230 to the rearward direction, respectively. Due to the elastic force of the upper and lower torsion springs 241, 242, 243 and 244, the upper and lower plates 210 and 230 are biased to the leftward and rearward directions, respectively, if there is no external force applied to the upper and lower plates 210 and 230. Thus, the upper and lower bodies 110 and 130 can be maintained in the closed position relative to the intermediate body 220 if the external force is not applied thereto.

At this time, the guide pin 231 of the lower plate 230 inserted into the guide hole 221 of the intermediate plate 220 is positioned at a cross point between the transverse guide track 231A and the longitudinal track 231B formed at the lower surface of the upper plate 210.

After that, as shown in FIG. 12, if the external force is applied to the upper body 110 in the rightward direction, the upper body 110 moves in the rightward direction relative to the intermediate body 120 while exposing the intermediate body 120. At this time, the upper plate 210 of the hinge module moves in the rightward direction so that the upper plate 210 is biased to the rightward direction relative to the intermediate plate 220 of the hinge module. In addition, when the upper plate 210 moves beyond the threshold point, the upper torsion springs 241 and 242, which bias the upper plate 210 to the leftward direction, are turned so that the upper torsion springs 241 and 242 elastically bias the upper plate 210 to the rightward direction, that is, the upper torsion springs 241 and 242 bias the upper plate 210 such that the upper body 110 can be moved into the opened position.

As the upper body 110 moves into the opened position relative to the intermediate body 120, the end portion of the guide pin 231 of the lower plate 230 is positioned on the transverse guide track 231A (see, FIG. 7). Thus, the lower plate 230 is prevented from moving in the forward or rearward direction, so that the lower body 130 is not moved relative to the intermediate body 120.

Meanwhile, if the external force is applied to the lower body 130 in the forward direction when the lower body 130 is maintained in a state as shown in FIG. 11, the lower body 130 moves in the forward direction relative to the intermediate body 120 so that the lower body 130 is exposed to the exterior as shown in FIG. 13. At this time, the lower plate 230 of the hinge module 200 also moves in the forward direction so that the lower plate 230 of the hinge module 200 is biased to the forward direction relative to the intermediate plate 220 of the hinge module 200. In addition, when the lower plate 230 moves beyond the threshold point, the lower torsion springs 243 and 244, which are installed at the lower portion of the intermediate plate 220 in order to bias the lower plate 230 to the rearward direction, are turned so that the lower torsion springs 243 and 244 elastically bias the intermediate plate 220 to the forward direction, that is, the lower torsion springs 243 and 244 bias the intermediate plate 220 such that the lower body 130 can be moved into the opened position relative to the intermediate body 120.

As the lower body 130 moves into the opened position, the end portion of the guide pin 231 of the lower plate 230 is positioned on the longitudinal guide track 231B (see, FIG. 7). Thus, the upper plate 210 is prevented from moving in the leftward and rightward directions, so that the upper body 110 is not moved relative to the intermediate body 210.

Hereinafter, description will be made in relation to another embodiment of the present invention.

Figure 14:
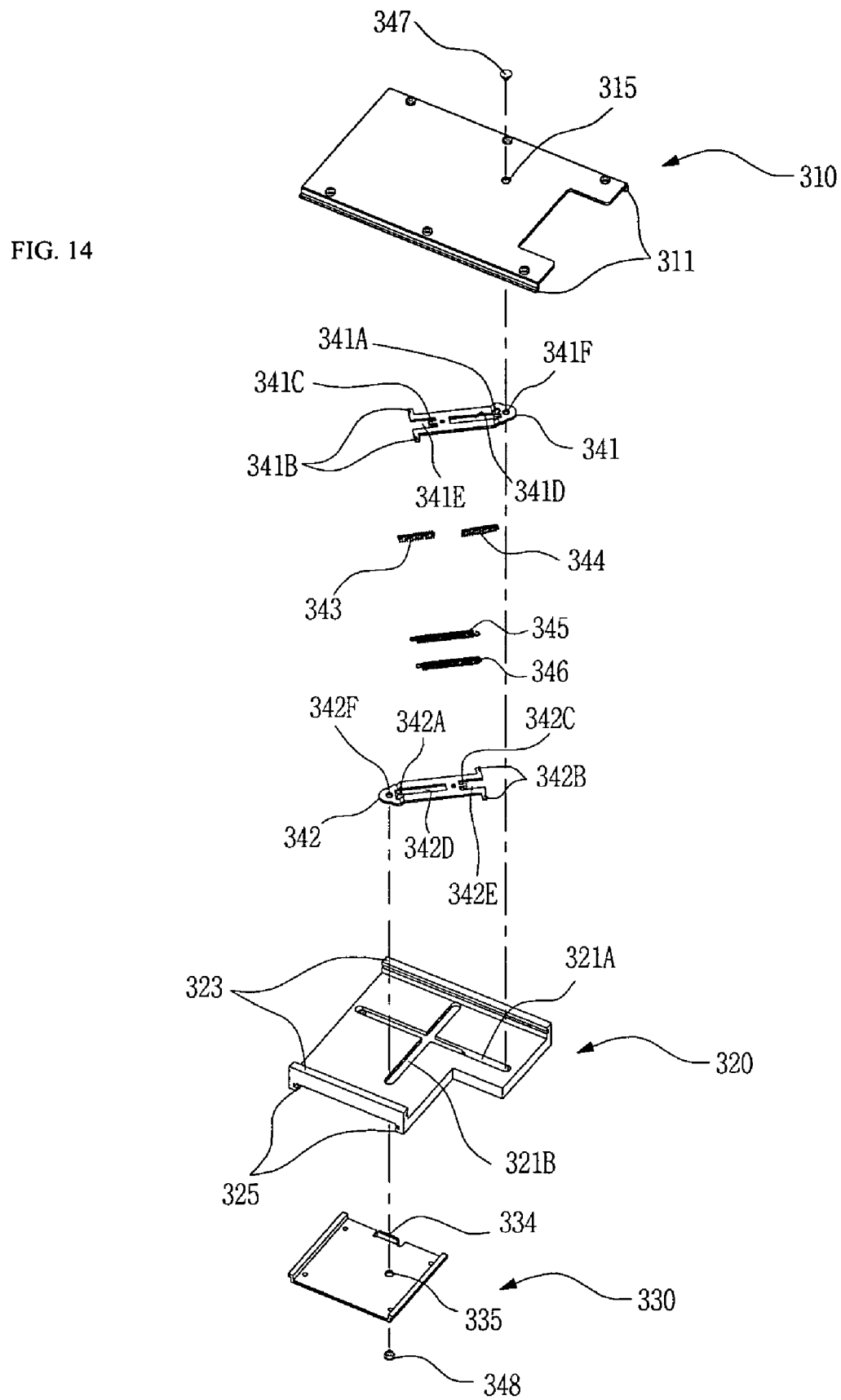
FIG. 14 is an exploded perspective view illustrating a hinge module according to another embodiment of the present invention.
Figure 15:
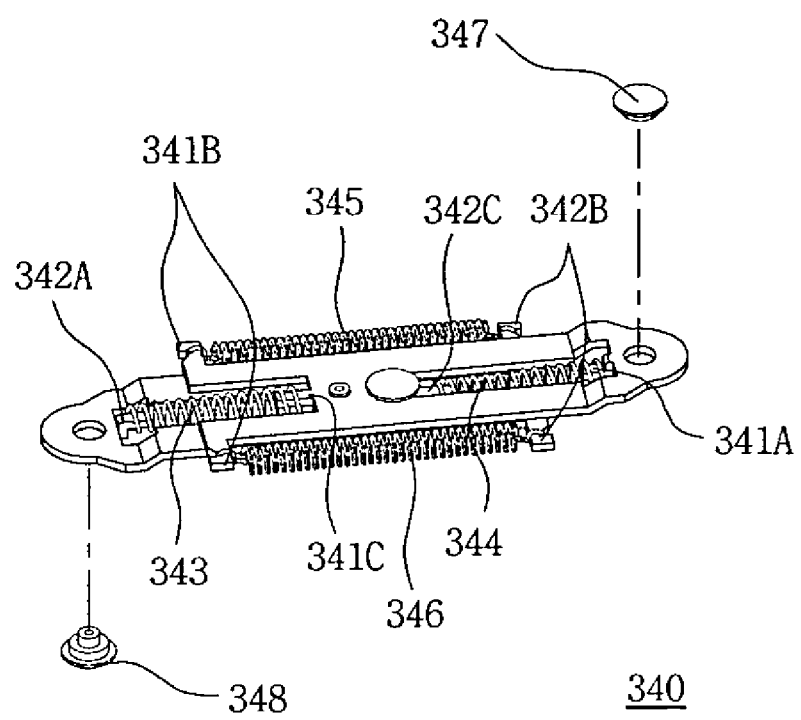
FIG. 15 is a perspective view illustrating a guide member of a hinge module according to another embodiment of the present invention.

FIG. 14 is an exploded perspective view illustrating a hinge module according to another embodiment of the present invention and FIG. 15 is a perspective view illustrating a guide member of a hinge module according to another embodiment of the present invention.

As shown in FIGS. 14 and 15, the hinge module according to another embodiment of the present invention further includes the guide member 340 instead of the elastic member for semi-automatically moving the upper and lower bodies 110 and 130. The guide member 340 not only provides the elastic force, but also prevents the upper and lower bodies 110 and 130 from simultaneously moving into the opened position relative to the intermediate body 120. In addition, the structures of the upper, intermediate and lower plates 310, 320 and 330 are modified corresponding to the structure of the guide member 340. Hereinafter, the structure of the hinge module according to another embodiment of the present invention will be described in detail while focusing on the guide member 340.

The intermediate plate 320 has at inverse guide hole 321A and a longitudinal guide hole 321B, which cross each other. The upper plate 310 has no guide track 213, which is formed in the upper plate 210 (see, FIG. 7). Besides above, the structures of the upper, intermediate and lower plates 310, 320 and 330 are substantially identical to those of the upper, intermediate and lower plates 210, 220 and 230, so they will not be further described below.

The guide member 340 includes a first guide bar 341, a second guide bar 342, a spring group having a plurality of springs 343, 344, 345 and 346, an upper coupling pin 347 and a lower coupling pin 348.

The first and second guide bars 341 and 342 of the guide member 340 are overlapped with each other and front ends of the first and second guide bars 341 and 342 are directed in opposition to each other. The first guide bar 341 is coupled with the second guide bar 342 by means of the springs 343, 344, 345 and 346 of the spring group, which will be described later in detail when explaining the spring group. If the first and second guide bars 341 and 342 are coupled to each other by means of the spring group, the guide member 340 can be expanded and contracted about the overlapped area between the first and second guide bars 341 and 342. The first guide bar 341 is formed at front and rear end portions thereof with cutting sections 341D and 341E, respectively. In addition, protrusions 341A and 341C are provided in the cutting sections 341D and 341E such that first ends of compression springs 343 and 344 can be coupled with the protrusions 341A and 341C. Similarly, the second guide bar 342 is formed at front and rear end portions thereof with cutting sections 342D and 342E, respectively. In addition, protrusions 342A and 342C are provided in the cutting sections 342D and 342E such that second ends of the compression springs 343 and 344 can be coupled with the protrusions 342A and 342C. Protrusions 341B and 342B are provided at both sides of rear end portions of the first and second guide bars 341 and 342 so that both end portions of tension springs 345 and 346 are coupled with the protrusions 341B and 342B.

The spring group includes the compression spring 344, which is coupled with the protrusion 341A of the first guide bar 341 and the protrusion 342C of the second guide bar 342. In addition, the spring group includes the compression spring 343, which is coupled with the protrusion 342A of the second guide bar 342 and the protrusion 341C of the first guide bar 341. The compression springs 343 and 344 bias the first and second guide bars 341 and 342 in opposition to each other, thereby allowing the guide member 340 to be expanded or contracted within a limited range. In addition, the spring group includes a pair of tension springs 345 and 346, which are coupled to protrusions 341B and 342B provided at both side ends of the rear end portions of the first and second guide bars 341 and 342. The tension springs 345 and 346 are connected between the rear end portion of the first guide bar 341 and the rear end portion of the second guide bar 342 in the overlapped area between the first and second guide bars 341 and 342 so as to allow the guide member 340 to be expanded or contracted. In addition, the tension springs 345 and 346 prevents the first and second guide bars 341 and 342 from being separated from each other.

The upper coupling pin 347 passes through the upper plate 310 from the upper portion of the upper plate 310 and rotatably passes through the front end portion of the first guide bar 341. Then, the upper coupling pin 347 is slidably inserted into the transverse guide hole 321A. To this end, the upper plate 310 is formed with a perforation hole 315 and the front end of the first guide bar 341 is formed with a perforation hole 341F. The lower coupling pin 348 passes through the lower plate 330 from the lower portion of the lower plate 330 and slidably passes through the longitudinal guide hole 321B. Then, the lower coupling pin 348 rotatably inserted into the front end portion of the second guide bar 342 aligned in opposition to the front end of the first guide bar 341. To this end, the lower plate 330 is formed with a perforation hole 335 and the front end portion of the second guide bar 342 is formed with a perforation hole 342F. Due to the upper and lower coupling pins 347 and 348, the upper plate 310 and the lower plate 330 move along a predetermined route defined by the transverse and longitudinal guide holes 321A and 321B.

Figure 16:
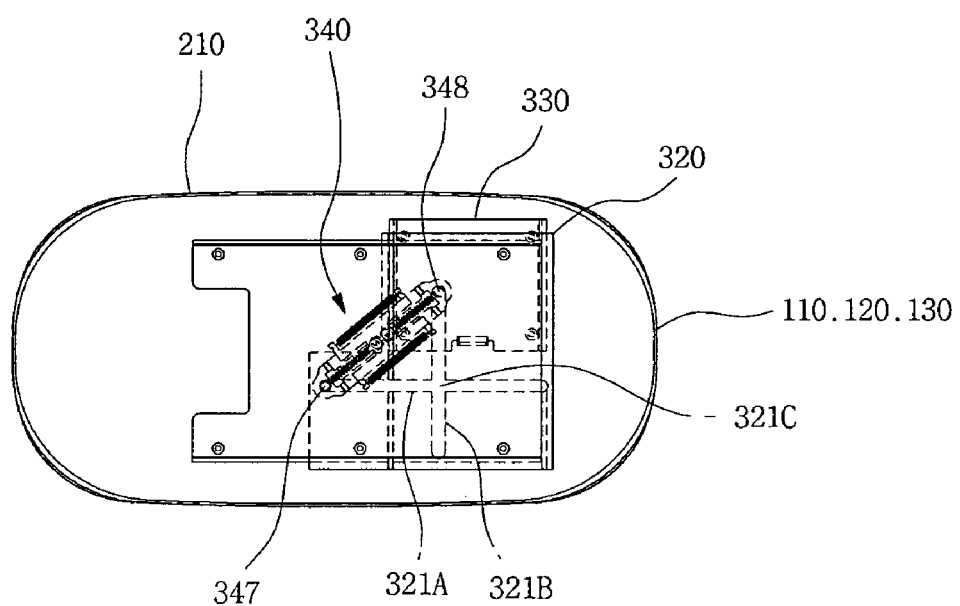
FIGS. 16 through 18 are reference views illustrating operational states of a hinge module according to another embodiment of the present invention.
Figure 17:
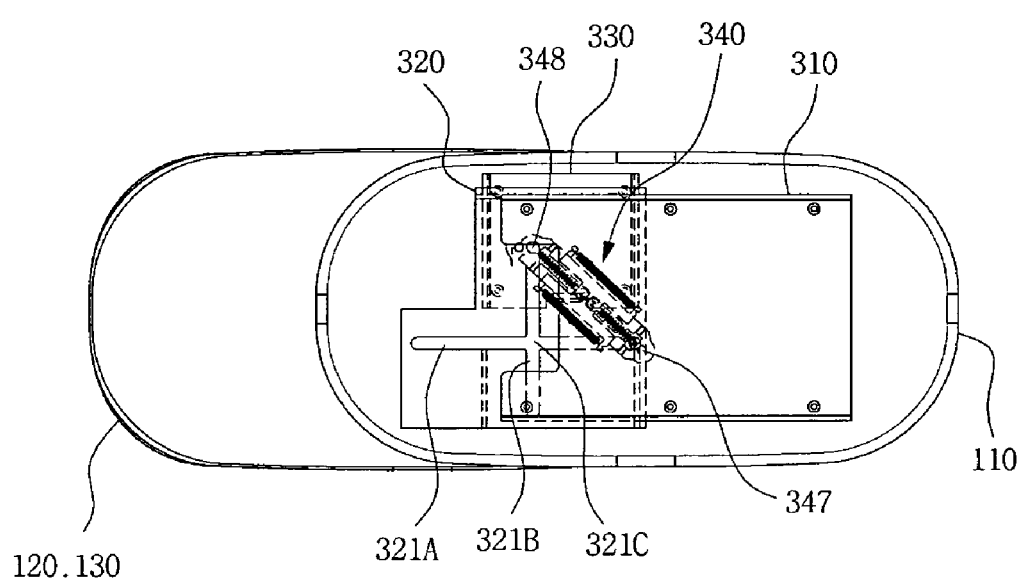
Figure 18:
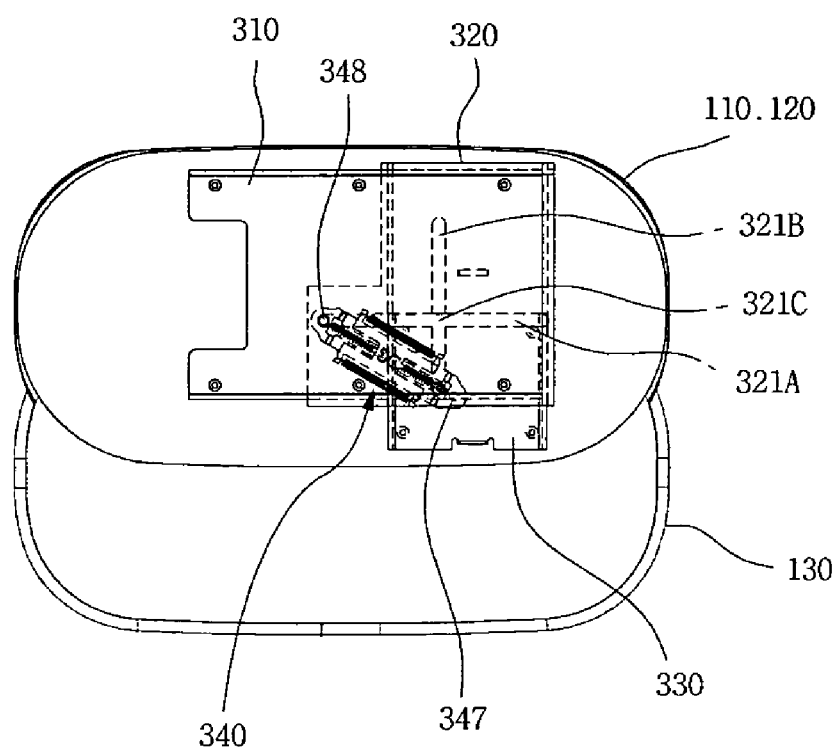

Hereinafter, the operation of the hinge module according to another embodiment of the present invention will be described with reference to accompanying drawings, especially with reference to FIGS. 16 through 18. FIGS. 16 through 18 are reference views for explaining the operational state of the hinge module according to another embodiment of the present invention.

FIG. 16 illustrates the hinge module when the upper and lower bodies 110 and 130 are aligned in a closed position relative to the intermediate body 120. In this state, the upper plate 310 is biased to the leftward direction and the lower plate 330 is biased to the rearward direction relative to the intermediate plate 320, respectively. In addition, an upper coupling pin 347 of the guide member 340 coupled to the upper plate 310 is biased to the leftward direction in the transverse guide hole 321A and a lower coupling pin 348 of the guide member 340 coupled to the lower plate 330 is biased to the rearward direction in the longitudinal guide hole 321B. The guide member 340 is expanded and contracted by means of elastic force of the springs while urging the upper and lower plates 310 and 330 to move against each other. Due to the guide member 340, the upper and lower plates 310 and 330 can be biased to the leftward and rearward directions, respectively, if there is no external force applied thereto. Thus, the upper and lower bodies 110 and 130 can be maintained in a closed position relative to the intermediate body 120.

In this state, if the external force is applied to the upper body 110 in the rightward direction, as shown in FIG. 17, the upper body 110 moves in the rightward direction relative to the intermediate body 120 so that the intermediate body 120 is exposed to the exterior. At this time, the upper plate 310 of the hinge module also moves in the rightward direction relative to the intermediate plate 320 of the hinge module. Thus, the upper coupling pin 347 of the guide member 340 coupled to the upper plate 310 moves from the left portion of the transverse guide hole 321A to the right portion of the transverse guide hole 321A. During this process, the guide member 340 performs a pseudo-oscillating movement. That is, the upper coupling pin 347 moves from the left portion to the right portion of the transverse guide hole 321A about the lower coupling pin 348. While the upper coupling pin 347 is moving from the left portion to the right portion of the transverse guide hole 321A, the guide member 340 is gradually contracted while overcoming the bias force of the springs until the upper coupling pin 347 reaches a cross point 321C between the traverse guide hole 321A and the longitudinal guide hole 321B. When the upper coupling pin 347 reaches the cross point 321C, the guide member 340 is contracted in a minimum size, so that the elastic energy accumulated in the guide member 340 is maximized. Even in this state, the upper plate 310 tends to be biased to the leftward direction.

However, if the upper coupling pin 347 moves beyond the cross point 321C, the elastic energy accumulated in the guide member 340 is suddenly released so that guide member 340 is expanded while applying the bias force to the upper plate 310 in the rightward direction. That is, as the direction of the guide member 340 performing the pseudo-oscillating movement about the lower coupling pin 348 is changed from the left to the right, the direction of the elastic force of the springs applied to the guide member 340 to expand the guide member 340 matches with the direction of the external force applied to the guide member 340 so that the guide member 340 is instantly expanded. Thus, the upper plate 310 instantly moves to the rightmost portion of the transverse guide hole 321A, so that the upper body 110 is maintained in the opened position relative to the intermediate body 120.

Meanwhile, if the external force is applied to the lower body 110 in the forward direction when the lower body 110 is maintained in a state as shown in FIG. 16, the lower body 130 moves in the forward direction relative to the intermediate body 120 so that the lower body 130 is exposed to the exterior as shown in FIG. 18. At this time, the lower plate 330 of the hinge module also moves in the forward direction relative to the intermediate plate 320 of the hinge module. Thus, the lower coupling pin 348 of the guide member 340 coupled to the lower plate 330 moves from the rear portion of the longitudinal guide hole 321B to the front portion of the longitudinal guide hole 321B. During this process, the guide member 340 performs a pseudo-oscillating movement about the upper coupling pin 347, so that the lower coupling pin 348 moves from the rear portion to the front portion of the longitudinal guide hole 321B. While the lower coupling pin 348 is moving from the rear portion to the front portion of the longitudinal guide hole 321B, the guide member 340 is gradually contracted while overcoming the bias force of the springs until the lower coupling pin 348 reaches the cross point 321C between the transverse guide hole 321A and the longitudinal guide hole 321B. When the lower coupling pin 348 reaches the cross point 321C, the guide member 340 is contracted in a minimum size, so that the elastic energy accumulated in the guide member 340 is maximized. Even in this state, the lower plate 330 tends to be biased to the rearward direction.

However, if the lower coupling pin 348 moves beyond the cross point 321C, the elastic energy accumulated in the guide member 340 is suddenly released so that guide member 340 is expanded while applying the bias force to the lower plate 330 in the forward direction. That is, as the direction of the guide member 340 performing the pseudo-oscillating movement about the upper coupling pin 347 is changed from the rearward direction to the forward direction, the direction of the elastic force of the springs applied to the guide member 340 to expand the guide member 340 matches with the direction of the external force applied to the guide member 340 so that the guide member 340 is instantly expanded. Thus, the lower plate 330 instantly moves to the front portion of the longitudinal guide hole 321B, so that the lower body 130 is maintained in the opened position relative to the intermediate body 120.

Figure 19:
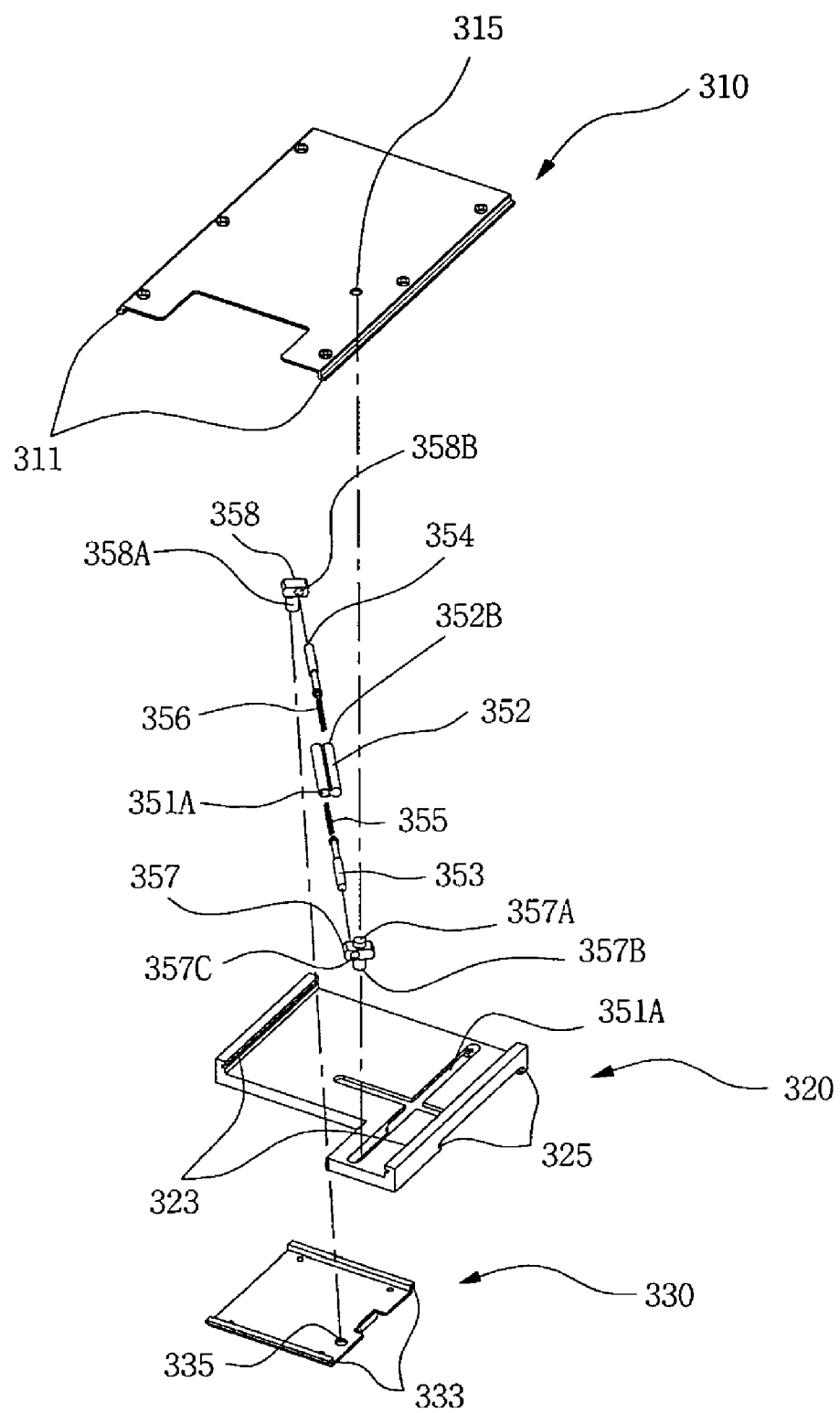
FIG. 19 is an exploded perspective view illustrating a hinge module according to still another embodiment of the present invention.
Figure 20:
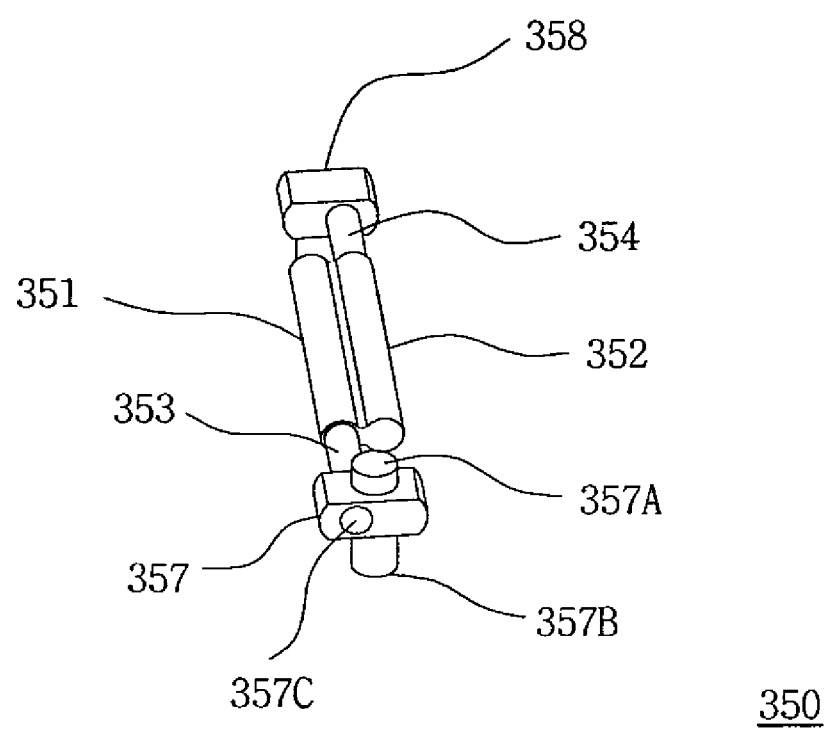
FIG. 20 is a perspective view illustrating a guide member of a hinge module according to still another embodiment of the present invention.

FIG. 19 is an exploded perspective view illustrating a hinge module according to still another embodiment of the present invention, and FIG. 20 is a perspective view illustrating a guide member of the hinge module according to still another embodiment of the present invention.

In the present embodiment, the structure of the guide member 350 is modified. The guide member 350 includes a housing assembly, first and second movement bars 353 and 354, compression springs 355 and 356, an upper coupling member 357 and a lower coupling member 358.

The housing assembly includes a first housing 351 and a second housing 352 coupled to the first housing 351. The first housing 351 has an inlet 351A and a second housing 352 has an inlet 352B in opposition to the inlet 351A.

The first and second movement bars 353 and 354 are partially accommodated in the first and second housings 351 and 352 in such a manner that they can be reciprocated through the housing inlets 351A and 351B, respectively. The first movement bar 353 is inserted into the first housing 351 and the second movement bar 354 is inserted into the second housing 352.

The compression springs 355 and 356 are installed in the first and second housings 351 and 352 while being coupled to rear portions of the first and second movement bars 353 and 354, respectively. Thus, the compression springs 355 and 356 elastically bias the first and second movement bars 353 and 354 in opposition to each other.

The upper coupling member 357 has an insertion hole 357C into which a front end portion of the first movement bar 353 is inserted. The upper coupling member 357 is provided with an upper coupling protrusion 357A, which is rotatably coupled into the upper plate 310. In addition, the upper coupling member 357 has a guide protrusion 357B, which is slidably inserted into the transverse guide hole 321A and moves along the transverse guide hole 321A.

The lower coupling member 358 has an insertion hole 358B, into which a front end portion of the second movement bar 354 is inserted, and is slidably inserted into the longitudinal guide hole 321B. In addition, the lower coupling member 358 has a lower coupling protrusion 358A, which is rotatably coupled into the lower plate 330.

Although a pair of housings 351 and 352 and a pair of movement bars 353 and 354 are provided in the present embodiment, it is also possible to provide at least three housings or movement bars. Such a modification may be helpful to adjust the external force required for moving the upper and lower bodies 110 and 130 by adjusting the elastic force of the springs.

As described above, the present invention provide a hinge module for a three-step open type portable terminal and a portable terminal having the same, in which a body of the portable terminal is divided into three body sections and semi-automatically slides, thereby realizing an optimum input/output system in a communication terminal, such as a mobile phone, a PDA, a DMB (digital multimedia broadcasting) phone, or a personal multimedia player.

In addition, according to the present invention, a safety device is provided to prevent the upper body and the lower body from simultaneously moving into the opened position relative to the intermediate body, so that problems derived from the multi-step body can be solved.

Although the present invention provides the three-step open type portable terminal, since the upper and lower bodies semi-automatically slide relative to the intermediate body, the opening/closing state of the body can be maintained if there is no external force applied to the upper and lower bodies.

In addition, according to the present invention, the guide member can be exchanged with the housing assembly. In this case, it is easy to adjust the external force required for moving the upper and lower bodies by adjusting the elastic force of the springs.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A hinge module for a three-step open type portable terminal including:
   an upper body;
   an intermediate body coupled to the upper body wherein the upper body is movable in a transverse direction or a longitudinal direction;
   a lower body coupled to the intermediate body wherein the lower body is movable in the transverse direction or the longitudinal direction perpendicularly to a movement direction of the upper body, wherein the hinge module prevents the upper and lower bodies from simultaneously moving into an opened position relative to the intermediate body;
   an intermediate plate fixed to the intermediate body of the portable terminal and formed with a longitudinal guide hole;
   an upper plate fixed to the upper body of the portable terminal, coupled to the intermediate plate wherein the upper plate is movable in a transverse direction relative to the intermediate plate, and provided with a guide track extending in transverse and longitudinal directions; and a lower plate fixed to the lower body of the portable terminal, coupled to the intermediate plate wherein the lower plate is movable in a longitudinal direction relative to the intermediate plate, and provided with a guide pin, which passes through the guide hole of the intermediate plate and moves along the guide track of the upper plate in order to prevent the upper and lower bodies from simultaneously moving into the opened position relative to the intermediate body.

2. The hinge module as claimed in claim 1, wherein the guide track is formed along a lower edge portion of the upper plate.

3. The hinge module as claimed in claim 1, further comprising an elastic member installed between the intermediate plate and the upper plate and between the intermediate plate and the lower plate, respectively, wherein the elastic member applies an elastic force to the upper and lower plates wherein the upper and lower plates are biased to a closed position relative to the intermediate plate when the upper and lower plates move within a threshold point and biased to an opened position relative to the intermediate plate when the upper and lower plates move beyond the threshold point.

4. The hinge module as claimed in claim 3, wherein the elastic member includes a pair of first torsion springs installed between the intermediate plate and the upper plate and a pair of second torsion springs installed between the intermediate plate and the lower plate.

5. The hinge module as claimed in claim 1, wherein the hinge module includes:

an intermediate plate fixed to the intermediate body of the portable terminal and formed with a longitudinal guide hole and a transverse guide hole;

an upper plate fixed to the upper body of the portable terminal and coupled to the intermediate plate wherein the upper plate is movable in a transverse direction relative to the intermediate plate;

a lower plate fixed to the lower body of the portable terminal and coupled to the intermediate plate wherein the lower plate is movable in a longitudinal direction relative to the intermediate plate; and a guide member having a first end portion hinged to the upper plate and moved along the transverse guide hole and a second end portion hinged to the lower plate while passing through the longitudinal guide hole and moved along the longitudinal guide hole, wherein the guide member is expanded or contracted corresponding to a movement of the upper and lower plates.

6. The hinge module as claimed in claim 5, wherein the guide member has an extendable property and applies an elastic force to the upper and lower plates so as to bias the upper and lower plates to a closed position relative to the intermediate plate when the first and second end portions of the guide member move within a cross point between the transverse guide hole and the longitudinal guide hole and to bias the upper and lower plates to an opened position relative to the intermediate plate when the first and second end portions of the guide member move beyond the cross point.

7. The hinge module as claimed in claim 6, wherein the guide member includes:

first and second guide bars, which are overlapped with each other and front end portions of which are directed in opposition to each other;

a spring group having a plurality of springs coupled to both sides of the first and second guide bars so as to apply an elastic force to the first and second guide bars wherein the first and second guide bars are biased in opposition to each other;

an upper coupling pin extending by passing through the upper plate and rotatably passing through the front end portion of the first guide bar so as to be slidably coupled into the transverse guide hole; and a lower coupling pin extending by passing through the lower plate and slidably passing through the longitudinal guide hole so as to be rotatably coupled into a front end portion of the second guide bar.

8. The hinge module as claimed in claim 7, wherein the spring group includes:

compression springs installed between the front end portion of the first guide bar and a rear end portion of the second guide bar and between the front end portion of the second guide bar and a rear end portion of the first guide bar so as to bias the first and second guide bars; and tension springs connected between rear end portions of the first and second guide bars in an overlapped area between the first and second guide bars so as to apply a tensioning force to the first and second guide bars.

9. The hinge module as claimed in claim 8, wherein the first and second guide bars are formed at front and rear end portions thereof with cutting sections, protrusions are provided in the cutting sections so as to allow the compression springs to be coupled with the protrusions, and coupling protrusions are provided at both sides of the rear end portions of the first and second guide bar so as to allow the tension springs to be coupled with the coupling protrusions.

10. The hinge module as claimed in claim 6, wherein the guide member includes:

a housing assembly including a plurality of housings having inlets formed in opposition to each other, first and second movement bars inserted into the inlets of the housings such that wherein the first and second movement bars are reciprocated in opposition to each other;

compression springs installed in the housings so as to apply an elastic force to the first and second movement bars, respectively;

an upper coupling member coupled to a front end portion of the first movement bar and provided with an upper coupling protrusion rotatably inserted into the upper plate and a guide protrusion slidably inserted into the transverse guide hole so as to move along the transverse guide hole; and a lower coupling member coupled to a front end portion of the second movement bar and provided with a lower coupling protrusion, which is slidably inserted into the longitudinal guide hole and rotatably inserted into the lower plate.

11. The hinge module as claimed in claim 1, wherein the intermediate plate is provided at front and rear end portions of an upper surface thereof with transverse rails having "C"-shaped sections, the upper plate is provided at front and rear end portions of a lower surface thereof with transverse rails having L-shaped sections, and the transverse rails having L-shaped sections are slidably coupled with the transverse rails having "C"-shaped sections so that the upper plate is coupled with the intermediate plate.

12. The hinge module as claimed in claim 1, wherein the intermediate plate is provided at left and right end portions of a lower surface thereof with longitudinal rails having "C"-shaped sections, the lower plate is provided at left and right end portions of an upper surface thereof with longitudinal sliding members having reverse L-shaped sections, and the longitudinal sliding members having reverse L-shaped sections are slidably coupled with the longitudinal rails having "C"-shaped sections so that the lower plate is coupled with the intermediate plate.

13. A hinge module for a three-step open type portable terminal including an upper body, an intermediate body and a lower body, the hinge module comprising:
   an intermediate plate fixed to the intermediate body of the portable terminal, formed with a longitudinal guide hole, provided at front and rear end portions of an upper surface thereof with transverse rails having "C"-shaped sections, and provided at left and right end portions of a lower surface thereof with longitudinal rails having "C"-shaped sections;
   an upper plate fixed to the upper body of the portable terminal, provided at front and rear end portions of a lower surface thereof with transverse rails having L-shaped sections which are slidably coupled with the transverse rails having "C"-shaped sections so as to couple the upper plate to the intermediate plate wherein the upper plate is movable in a transverse direction relative to the intermediate plate, and provided at a lower edge portion thereof with a guide track extending in transverse and longitudinal directions;
   a lower plate fixed to the lower body of the portable terminal, provided at left and right end portions of an upper surface thereof with longitudinal sliding members having reverse L-shaped sections, which are slidably coupled with the longitudinal rails having "C"-shaped sections so that the lower plate is coupled with the intermediate plate wherein the lower plate is movable in a longitudinal direction relative to the intermediate plate, and provided with a guide pin, which passes through the guide hole of the intermediate plate and moves along the guide track of the upper plate in order to prevent the upper and lower bodies from simultaneously moving into an opened position relative to the intermediate body, and
   a pair of first torsion springs installed between the intermediate plate and the upper plate and a pair of second torsion springs installed between the intermediate plate and the lower plate, wherein the first and second torsion springs apply an elastic force to the upper and lower plates wherein the upper and lower plates are biased to a closed position relative to the intermediate plate when the upper and lower plates move within a threshold point and biased to the opened position relative to the intermediate plate when the upper and lower plates move beyond the threshold point.

14. A hinge module for a three-step open type portable terminal including an upper body, an intermediate body and a lower body, the hinge module comprising:
   an intermediate plate fixed to the intermediate body of the portable terminal, formed with a transverse guide hole and a longitudinal guide hole perpendicular to the transverse guide hole, provided at front and rear end portions of an upper surface thereof with transverse rails having "C"-shaped sections, and provided at left and right end portions of a lower surface thereof with longitudinal rails having "C"-shaped sections;
   an upper plate fixed to the upper body of the portable terminal, and provided at front and rear end portions of a lower surface thereof with transverse rails having L-shaped sections which are slidably coupled with the transverse rails having "C"-shaped sections so as to couple the upper plate to the intermediate plate wherein the upper plate is movable in a transverse direction relative to the intermediate plate;
   a lower plate fixed to the lower body of the portable terminal, and provided at left and right end portions of an upper surface thereof with longitudinal sliding members having reverse L-shaped sections, which are slidably coupled with the longitudinal rails having "C"-shaped sections so that the lower plate is coupled with the intermediate plate wherein the lower plate is movable in a longitudinal direction relative to the intermediate plate; and
   a guide member having a first end portion hinged to the upper plate and moved along the transverse guide hole and a second end portion hinged to the lower plate while passing through the longitudinal guide hole and moved along the longitudinal guide hole, wherein the guide member is expanded or contracted corresponding to a movement of the upper and lower plates, and the guide member applies an elastic force to the upper and lower plates so as to bias the upper and lower plates to a closed position relative to the intermediate plate when the first and second end portions of the guide member move within a cross point between the transverse guide hole and the longitudinal guide hole and to bias the upper and lower plates to an opened position relative to the intermediate plate when the first and second end portions of the guide member move beyond the cross point,
   the guide member includes first and second guide bars, a spring group, an upper coupling pin and a lower coupling,
   the first and second guide bars are formed at front and rear end portions thereof with cutting sections, protrusions are provided in the cutting sections, coupling protrusions are provided at both sides of the rear end portions of the first and second guide bar, and the first and second guide bars are overlapped with each other wherein front end portions of which are directed in opposition to each other,
   the spring group includes a pair of compression springs and a pair of tension springs for biasing the first and second guide bars in opposition to each other, in which the compression springs have first end portions coupled with the protrusions provided at the front end portion of the first guide bar and a rear end portion of the second guide bar and second end portions coupled with the protrusions provided at the front end portion of the second guide bar and a rear end portion of the first guide bar, and the tension springs are coupled with the coupling protrusions provided at rear end portions of the first and second guide bars in an overlapped area between the first and second guide bars,
   the upper coupling pin extends by passing through the upper plate and rotatably passing through the front end portion of the first guide bar so as to be slidably coupled into the transverse guide hole, and
   the lower coupling pin extends by passing through the lower plate and slidably passing through the longitudinal guide hole so as to be rotatably coupled into a front end portion of the second guide bar.

15. A hinge module for a three-step open type portable terminal including an upper body, an intermediate body and a lower body, the hinge module comprising:
   an intermediate plate fixed to the intermediate body of the portable terminal, formed with a transverse guide hole and a longitudinal guide hole perpendicular to the transverse guide hole, provided at front and rear end portions of an upper surface thereof with transverse rails having "C"-shaped sections, and provided at left and right end portions of a lower surface thereof with longitudinal rails having "C"-shaped sections;

an upper plate fixed to the upper body of the portable terminal, and provided at front and rear end portions of a lower surface thereof with transverse rails having L-shaped sections which are slidably coupled with the transverse rails having "C"-shaped sections so as to couple the upper plate to the intermediate plate wherein the upper plate is movable in a transverse direction relative to the intermediate plate;

a lower plate fixed to the lower body of the portable terminal, and provided at left and right end portions of an upper surface thereof with longitudinal sliding members having reverse L-shaped sections, which are slidably coupled with the longitudinal rails having "C"-shaped sections so that the lower plate is coupled with the intermediate plate wherein the lower plate is movable in a longitudinal direction relative to the intermediate plate; and a guide member having a first end portion hinged to the upper plate and moved along the transverse guide hole and a second end portion hinged to the lower plate while passing through the longitudinal guide hole and moved along the longitudinal guide hole, wherein the guide member is expanded or contracted corresponding to a movement of the upper and lower plates, and the guide member applies an elastic force to the upper and lower plates so as to bias the upper and lower plates to a closed position relative to the intermediate plate when the first and second end portions of the guide member move within a cross point between the transverse guide hole and the longitudinal guide hole and to bias the upper and lower plates to an opened position relative to the intermediate plate when the first and second end portions of the guide member move beyond the cross point, the guide member including a housing assembly consisting of a plurality of housings having inlets formed in opposition to each other, first and second movement bars inserted into the inlets of the housings such that wherein the first and second movement bars are reciprocated in opposition to each other, compression springs installed in the housings so as to apply an elastic force to the first and second movement bars, respectively, an upper coupling member coupled to a front end portion of the first movement bar and provided with an upper coupling protrusion rotatably inserted into the upper plate and a guide protrusion slidably inserted into the transverse guide hole so as to move along the transverse guide hole, and a lower coupling member coupled to a front end portion of the second movement bar and provided with a lower coupling protrusion, which is slidably inserted into the longitudinal guide hole and rotatably inserted into the lower plate.

16. A three-step open type portable terminal comprising:
an upper body;
an intermediate body;
a lower body;
a hinge module, wherein the hinge module couples the upper body to the intermediate body wherein the upper body is movable in a transverse direction relative to the intermediate body, and the hinge module couples the lower body to the intermediate body wherein the lower body is movable in a longitudinal direction relative to the intermediate body;

an intermediate plate fixed to the intermediate body;

an upper plate fixed to the upper body and coupled to the intermediate plate wherein the upper plate is moveable in a transverse direction relative to the intermediate plate;

a lower plate fixed to the lower body and coupled to the intermediate plate wherein the lower plate is moveable in a longitudinal direction relative to the intermediate plate; and wherein the intermediate plate further includes a longitudinal guide hole, the upper plate further includes a guide track formed at a lower edge portion of the upper plate in transverse and longitudinal directions, and the lower plate further includes a guide pin, which passes through the longitudinal guide hole of the intermediate plate and moves along the guide track of the upper plate in order to prevent the upper and lower bodies from simultaneously moving into an opened position relative to the intermediate plate.

17. The three-step open type portable terminal as claimed in claim 16, wherein the upper body is provided at an upper surface thereof with a screen and a first keypad group, the intermediate body is provided at an upper surface thereof with a second keypad group and the lower body is provided at an upper surface thereof with a third keypad group.

18. The three-step open type portable terminal as claimed in claim 17, wherein the first keypad group is aligned at left and right portions of the upper body about the screen, the second keypad group is aligned at an exposed portion of the intermediate body, and the third keypad group is aligned at a front part of an exposed portion of the lower body.

19. The three-step open type portable terminal as claimed in claim 16, wherein the intermediate plate is provided at front and rear end portions of an upper surface thereof with transverse rails having "C"-shaped sections, the upper plate is provided at front and rear end portions of a lower surface thereof with transverse rails having L-shaped sections, and the transverse rails having L-shaped sections are slidably coupled with the transverse rails having "C"-shaped sections so that the upper plate is coupled with the intermediate plate, wherein the intermediate plate is provided at left and right end portions of a lower surface thereof with longitudinal rails having "C"-shaped sections, the lower plate is provided at left and right end portions of an upper surface thereof with longitudinal sliding members having reverse L-shaped sections, and the longitudinal sliding members having reverse L-shaped sections are slidably coupled with the longitudinal rails having "C"-shaped sections so that the lower plate is coupled with the intermediate plate.

20. The three-step open type portable terminal as claimed in claim 16, further comprising an elastic member for applying an elastic force to the upper and lower plates wherein the upper and lower plates are biased to a closed position relative to the intermediate plate when the upper and lower plates move within a threshold point and biased to an opened position relative to the intermediate plate when the upper and lower plates move beyond the threshold point, wherein the elastic member includes a pair of first torsion springs installed between the intermediate plate and the upper plate and a pair of second torsion springs installed between the intermediate plate and the lower plate.

21. The three-step open type portable terminal as claimed in claim 16, wherein:

the intermediate plate includes a transverse guide hole and a longitudinal guide hole perpendicular to the transverse guide hole, the hinge module includes a guide member having a first end portion hinged to the upper plate and moved along the transverse guide hole and a second aid portion hinged to the lower plate while passing through the longitudinal guide hole and moved along the longitudinal guide hole, wherein the guide member is expanded or contracted corresponding to a movement of the upper and lower plates, and the guide member applies an elastic force to the upper and lower plates so as to bias the upper and lower plates to a closed position relative to the intermediate plate when the first and second end portions of the guide member move within a cross point between the transverse guide hole and the longitudinal guide hole and to bias the upper and lower plates to an opened position relative to the intermediate plate when the first and second end portions of the guide member move beyond the cross point, the guide member includes first and second guide bars, a spring group, an upper coupling pin and a lower coupling, the first and second guide bars are formed at front and rear end portions thereof with cutting sections, protrusions are provided in the cutting sections, coupling protrusions are provided at both sides of the rear end portions of the first and second guide bar, and the first and second guide bars are overlapped with each other wherein front end portions of which are directed in opposition to each other, the spring group includes a pair of compression springs and a pair of tension springs for biasing the first and second guide bars in opposition to each other, in which the compression springs have first end portions coupled with the protrusions provided at the front end portion of the first guide bar and a rear end portion of the second guide bar and second end portions coupled with the protrusions provided at the front end portion of the second guide bar and a rear end portion of the first guide bar, and the tension springs are coupled with the coupling protrusions provided at rear end portions of the first and second guide bars in an overlapped area between the first and second guide bars, the upper coupling pin extends by passing through the upper plate and rotatably passing through the front end portion of the first guide bar so as to be slidably coupled into the transverse guide hole, and the lower coupling pin extends by passing through the lower plate and slidably passing through the longitudinal guide hole so as to be rotatably coupled into a front end portion of the second guide bar.

22. The three-step open type portable terminal as claimed in claim 16, wherein:

the intermediate plate includes a transverse guide hole and a longitudinal guide hole perpendicular to the transverse guide hole, the hinge module includes a guide member having a first end portion hinged to the upper plate and moved along the transverse guide hole and a second end portion hinged to the lower plate while passing through the longitudinal guide hole and moved along the longitudinal guide hole, wherein the guide member is expanded or contracted corresponding to a movement of the upper and lower plates, and the guide member applies an elastic force to the upper and lower plates so as to bias the upper and lower plates to a closed position relative to the intermediate plate when the first and second end portions of the guide member move within a cross point between the transverse guide hole and the longitudinal guide hole and to bias the upper and lower plates to an opened position relative to the intermediate plate when the first and second end portions of the guide member move beyond the cross point, the guide member including a housing assembly consisting of a plurality of housings having inlets formed in opposition to each owner, first and second movement bars inserted into the inlets of the housings wherein the first and second movement bars are reciprocated in opposition to each other, compression springs installed in the housings so as to apply an elastic force to the first and second movement bars, respectively, an upper coupling member coupled to a front end portion of the first movement bar and provided with an upper coupling protrusion rotatably inserted into the upper plate and a guide protrusion slidably inserted into the transverse guide hole so as to move along the transverse guide hole, and a lower coupling member coupled to a front end portion of the second movement bar and provided with a lower coupling protrusion, which is slidably inserted into the longitudinal guide hole and rotatably inserted into the lower plate.

* * * * *

UNITED STATES PATENT AND TRADEMARK OFFICE
CERTIFICATE OF CORRECTION

PATENT NO. : 7,778,663 B2  Page 1 of 1
APPLICATION NO. : 11/409893
DATED : August 17, 2010
INVENTOR(S) : Choi Bong Doo It is certified that error appears in the above-identified patent and that said Letters Patent is hereby corrected as shown below:

Col. 16;
Claim 10, line 37, delete "such that"
Claim 15, line 42, delete "such that"

Signed and Sealed this
Fifteenth Day of February, 2011

David J. Kappos
*Director of the United States Patent and Trademark Office*